US011948492B2

(12) United States Patent

Lee et al.

(10) Patent No.: US 11,948,492 B2

(45) Date of Patent: Apr. 2, 2024

(54) DISPLAY DEVICE

(71) Applicant: Samsung Display Co., Ltd., Yongin-si (KR)

(72) Inventors: Jinho Lee, Hwaseong-si (KR); Sungjae Park, Seongnam-si (KR); Seunghwan Park, Anyang-si (KR); Namjae Lim, Yongin-si (KR); Youngwoon Choi, Seoul (KR); Jong Wook Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/879,350

(22) Filed: Aug. 2, 2022

(65) Prior Publication Data

US 2023/0162643 A1 May 25, 2023

(30) Foreign Application Priority Data

Nov. 19, 2021 (KR) ........................ 10-2021-0160241

(51) Int. Cl.
*G09G 3/20* (2006.01)

(52) U.S. Cl.
CPC ..... *G09G 3/2007* (2013.01); *G09G 2310/027* (2013.01); *G09G 2320/041* (2013.01)

(58) Field of Classification Search
CPC ........... G09G 3/2007; G09G 2310/027; G09G 2320/041; G09G 2330/021
See application file for complete search history.

(56) References Cited

U.S. PATENT DOCUMENTS

| | | | | |
|---|---|---|---|---|
| 6,597,333 | B2 * | 7/2003 | Todoroki | G09G 3/2944 345/589 |
| 10,170,081 | B2 * | 1/2019 | Kageyama | G06T 5/40 |
| 11,482,164 | B2 * | 10/2022 | Choi | G09G 3/32 |
| 2003/0189558 | A1 | 10/2003 | Aoki et al. | |
| 2005/0253825 | A1 | 11/2005 | Kawamura et al. | |
| 2011/0187754 | A1 | 8/2011 | Yoo | |

(Continued)

FOREIGN PATENT DOCUMENTS

| | | |
|---|---|---|
| KR | 1020130012762 A | 2/2013 |
| KR | 1020140031071 A | 3/2014 |

(Continued)

OTHER PUBLICATIONS

Partial European Search Report for Application No. 22191653.9-1207 dated Apr. 12, 2023.

(Continued)

*Primary Examiner* — Gene W Lee

(74) *Attorney, Agent, or Firm* — CANTOR COLBURN LLP

(57) ABSTRACT

A display device includes a display panel and a display panel driver. The display panel includes pixels. The display panel driver determines an average image load of input image data, determines an operation mode based on a grayscale value of the input image data and the average image load as a first operation mode or a second operation mode, applies a first scale factor to the input image data in the first operation mode, applies a second scale factor different from the first scale factor to the input image data in the second operation mode, and drives the display panel.

17 Claims, 23 Drawing Sheets

(56) References Cited

U.S. PATENT DOCUMENTS

| | | | | |
|---|---|---|---|---|
| 2012/0139955 | A1* | 6/2012 | Jaffari | G06F 30/23 345/76 |
| 2016/0351133 | A1* | 12/2016 | Kim | G09G 3/3406 |
| 2017/0124959 | A1 | 5/2017 | Kim et al. | |
| 2017/0345352 | A1 | 11/2017 | Hemminki et al. | |
| 2019/0362671 | A1* | 11/2019 | Kuki | G09G 3/2007 |
| 2020/0184925 | A1 | 6/2020 | Huang | |
| 2021/0020140 | A1 | 1/2021 | Li et al. | |
| 2021/0286243 | A1 | 9/2021 | Narikawa | |
| 2023/0162668 | A1* | 5/2023 | Zen | G09G 3/3208 345/690 |

FOREIGN PATENT DOCUMENTS

| | | | |
|---|---|---|---|
| KR | 1020140070114 | A | 6/2014 |
| KR | 1020190048397 | A | 5/2019 |
| KR | 102044133 | B1 | 12/2019 |
| KR | 1020210043952 | A | 4/2021 |

OTHER PUBLICATIONS

Extended European Search Report for Application No. 22191653.9-1207 dated Jul. 12, 2023.

* cited by examiner

DISPLAY DEVICE

This application claims priority to Korean Patent Application No. 10-2021-0160241, filed on Nov. 19, 2021, and all the benefits accruing therefrom under 35 U.S.C. § 119, the content of which in its entirety is herein incorporated by reference.

BACKGROUND

1. Field

Embodiments of the invention relate to a display device. More particularly, embodiments of the invention relate to a display device adjusting luminance of a displayed image.

2. Description of the Related Art

Generally, a display device may include a display panel and a display panel driver. The display panel driver may include a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

SUMMARY

A conventional display device adjusts luminance of a displayed image by adjusting a grayscale value of input image data according to an average image load (In other word, an average picture level; APL) of the input image data in order to reduce power consumption. Therefore, since the grayscale value is adjusted based on only the average image load, the conventional display device does not reflect an effect of other factors (e.g., a temperature of the display panel, etc.) in adjusting the grayscale of the input image data.

Embodiments of the invention provide a display device determining an operation mode for adjusting luminance of a displayed image according to a grayscale value of input image data.

Embodiments of the invention also provide determining an operation mode for adjusting luminance of a displayed image according to a temperature of a display panel.

In an embodiment of the invention, a display device includes a display panel including a plurality of pixels, and a display panel driver which determines an average image load of input image data, to determine an operation mode based on a grayscale value of the input image data and the average image load as a first operation mode or a second operation mode, applies a first scale factor to the input image data in the first operation mode, applies a second scale factor different from the first scale factor to the input image data in the second operation mode, and drives the display panel.

In an embodiment, the display panel driver may operate as the first operation mode when a number of pixels which display the grayscale value less than or equal to a first reference grayscale value, among the plurality of pixels, is greater than a first reference number and the average image load is less than or equal to a first reference load.

In an embodiment, the display panel driver may generate a histogram for the grayscale value of the input image data, and calculate the number of the pixels which display the grayscale value less than or equal to the first reference grayscale value based on the histogram.

In an embodiment, the display panel driver may determine a first load scale factor according to the average image load in the first operation mode, determine a first grayscale scale factor according to the grayscale value of the input image data in the first operation mode, determine the first scale factor based on the first load scale factor and the first grayscale scale factor, determine a second load scale factor according to the average image load in the second operation mode, determine a second grayscale scale factor according to the grayscale value of the input image data in the second operation mode, and determine the second scale factor based on the second load scale factor and the second grayscale scale factor.

In an embodiment, the first scale factor may decrease as the average image load increases in a period in which the average image load is greater than or equal to a second reference load, and may have a first reference value in a period in which the average image load is less than the second reference load.

In an embodiment, the second scale factor may decrease as the average image load increases in a period in which the average image load is greater than or equal to a first reference load greater than the second reference load, and may have a second reference value less than the first reference value in a period in which the average image load is less than the first reference load.

In an embodiment, the first scale factor may decrease as a number of pixels which display the grayscale value less than or equal to a first reference grayscale value, among the plurality of pixels, decreases in a period in which the number of the pixels which display the grayscale value less than or equal to the first reference grayscale value is less than or equal to a second reference number, and may have a first reference value in a period in which the number of the pixels which display the grayscale value less than or equal to the first reference grayscale value is greater than the second reference number. The second scale factor may decrease as the number of the pixels which display the grayscale value less than or equal to the first reference grayscale value decreases in a period in which the number of the pixels which display the grayscale value less than or equal to the first reference grayscale value is less than or equal to a first reference number less than the second reference number, and may have a second reference value less than the first reference value in a period in which the number of the pixels which display the grayscale value less than or equal to the first reference grayscale value is greater than the first reference number.

In an embodiment, the display device may operate as the first operation mode when a number of pixels which display the grayscale value less than or equal to a first reference grayscale value, among the plurality of pixels, is greater than a first reference number and an temperature of the display panel is lower than or equal to a first reference temperature.

In an embodiment, the display panel driver may determine a first load scale factor according to the average image load in the first operation mode, determine a first grayscale scale factor according to the grayscale value of the input image data in the first operation mode, determine a first temperature scale factor according to the temperature of the display panel in the first operation mode, to determine the first scale factor based on the first load scale factor, the first grayscale scale factor, and the first temperature scale factor, determine a second load scale factor according to the average image load in the second operation mode, determine a second grayscale scale factor according to the grayscale value of the input image data in the second operation mode, determine a second temperature scale factor according to the temperature of the display panel in the second operation mode, and determine the second scale factor based on the second load scale factor, the second grayscale scale factor, and the second temperature scale factor.

In an embodiment, the display panel driver may apply the second scale factor to the pixels in which a deterioration degree of the pixels is greater than a reference deterioration degree among the plurality of pixels.

In an embodiment, the display panel driver may increase the grayscale value of the input image data to which the first scale factor or the second scale factor is applied when the grayscale value of the input image data to which the first scale factor or the second scale factor is applied is greater than a second reference grayscale value.

In an embodiment, the display panel may be divided into panel blocks, the panel blocks may include a first panel block and a second panel block adjacent to the first panel block, and the display panel driver may increase the grayscale value of the input image data corresponding to the first panel block to which the first scale factor or the second scale factor is applied when an average image load of the first panel block is greater than a sum of an average image load of the second panel block and a third reference value.

In an embodiment of the invention, a display device includes a display panel including pixels, and a display panel driver which determines an average image load of input image data, determines an operation mode based on a temperature of the display panel and the average image load as a first operation mode or a second operation mode, applies a first scale factor to the input image data in the first operation mode, applies a second scale factor different from the first scale factor to the input image data in the second operation mode, and drives the display panel.

In an embodiment, the display panel driver may operate as the first operation mode when the temperature of the display panel is lower than or equal to a first reference temperature and the average image load is less than or equal to a first reference load.

In an embodiment, the display panel driver may determine a first load scale factor according to the average image load in the first operation mode, determine a first temperature scale factor according to the temperature of the display panel in the first operation mode, determine the first scale factor based on the first load scale factor and the first temperature scale factor, determine a second load scale factor according to the average image load in the second operation mode, determine a second temperature scale factor according to the temperature of the display panel in the second operation mode, and determine the second scale factor based on the second load scale factor and the second temperature scale factor.

In an embodiment, the first scale factor may decrease as the average image load increases in a period in which the average image load is greater than or equal to a second reference load, and may have a first reference value in a period in which the average image load is less than the second reference load. The second scale factor may decrease as the average image load increases in a period in which the average image load is greater than or equal to a first reference load greater than the second reference load, and may have a second reference value less than the first reference value in a period in which the average image load is less than the first reference load.

In an embodiment, the first scale factor may decrease as the temperature of the display panel increases in a period in which the temperature of the display panel is higher than or equal to a second reference temperature, and may have a first reference value in a period in which the temperature of the display panel is lower than the second reference temperature. The second scale factor may decrease as the temperature of the display panel increases in a period in which the temperature of the display panel is higher than a first reference temperature higher than the second reference temperature, and may have a second reference value less than the first reference value in a period in which the temperature of the display panel is lower than the first reference temperature.

In an embodiment, the display panel driver may determine the temperature of the display panel by accumulating the input image data.

In an embodiment, the display panel driver may determine the temperature of the display panel by sensing driving currents of the pixels.

In an embodiment of the invention a display device includes a display panel including pixels, and a display panel driver which determines an operation mode based on a temperature of the display panel and a grayscale value of input image data as a first operation mode or a second operation mode, applies a first scale factor to the input image data in the first operation mode, applies a second scale factor different from the first scale factor to the input image data in the second operation mode, and drives the display panel.

Therefore, even when an average image load of input image data is small, the display device may adjust luminance of a displayed image to be low when a number of the pixels displaying a low grayscale value is small by determining the average image load of the input image data, determining an operation mode based on a grayscale value of an input image data and the average image load as a first operation mode or a second operation mode, applying a first scale factor to the input image data in the first operation mode, and applying a second scale factor different from the first scale factor to the input image data in the second operation mode. So, the display device may reduce power consumption.

In addition, even when an average image load of input image data is small, the display device may adjust luminance of a displayed image to be low when a temperature of a display panel is high by determining an average image load of input image data, determining an operation mode based on a temperature of the display panel and the average image load as a first operation mode or a second operation mode, applying a first scale factor to the input image data in the first operation mode, and applying a second scale factor different from the first scale factor to the input image data in the second operation mode.

Further, even when an average image load of input image data is small, the display device may adjust luminance of a displayed image to be low when a temperature of a display panel is high and a number of the pixels displaying a low grayscale value is small by determining an operation mode based on a temperature of the display panel and a grayscale value of input image data as a first operation mode or a second operation mode, applying a first scale factor to the input image data in the first operation mode, and applying a second scale factor different from the first scale factor to the input image data in the second operation mode.

However, the effects of the invention are not limited to the above-described effects, and may be variously expanded without departing from the spirit and scope of the invention.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
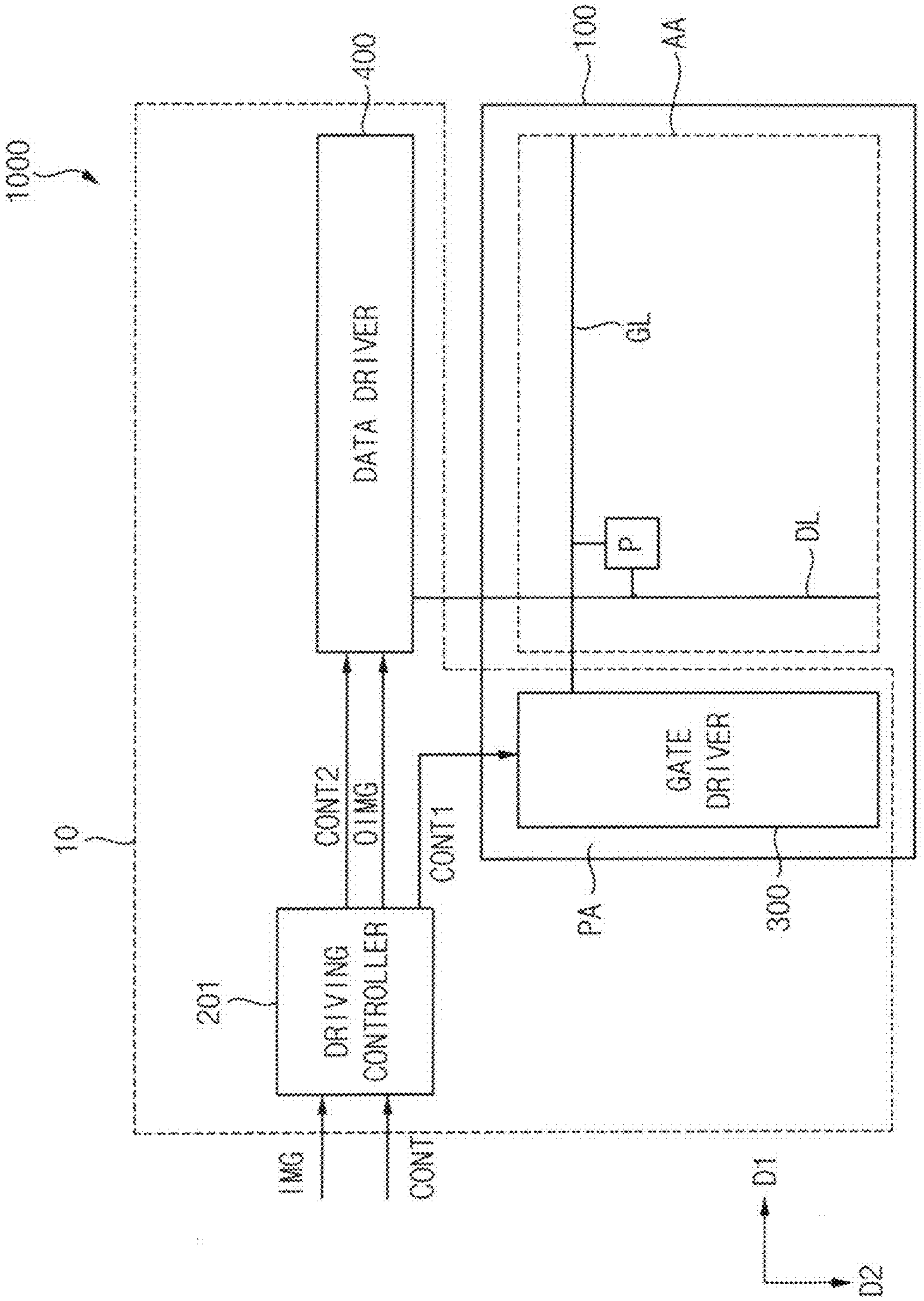
FIG. 1 is a block diagram illustrating a display device according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating a display device 1000 according to the invention.

Referring to FIG. 1, the display device 1000 may include a display panel 100 and a display panel driver 10. The display panel driver 10 may include a driving controller 201, a gate driver 300, and a data driver 400. In an embodiment, the driving controller 201 and the data driver 400 may be integrated into one chip.

The display panel 100 has a display region AA on which an image is displayed and a peripheral region PA adjacent to the display region AA. In an embodiment, the gate driver 300 may be integrated on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The driving controller 201 may receive input image data IMG and an input control signal CONT from a host processor (e.g., a graphic processing unit ("GPU")). In an embodiment, the input image data IMG may include red image data, green image data and blue image data, for example. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 201 may generate a first control signal CONT1, a second control signal CONT2, and output image data OIMG based on the input image data IMG and the input control signal CONT.

The driving controller 201 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 201 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 201 may receive the input image data IMG and the input control signal CONT, and generate the output image data OIMG. The driving controller 201 may output the output image data OIMG to the data driver 400.

The gate driver 300 may generate gate signals for driving the gate lines GL in response to the first control signal CONT1 input from the driving controller 201. The gate driver 300 may output the gate signals to the gate lines GL. In an embodiment, the gate driver 300 may sequentially output the gate signals to the gate lines GL, for example.

The data driver 400 may receive the second control signal CONT2 and the output image data OIMG from the driving controller 201. The data driver 400 may convert the output image data OIMG into data voltages having an analog type. The data driver 400 may output the data voltage to the data lines DL.

Figure 2:
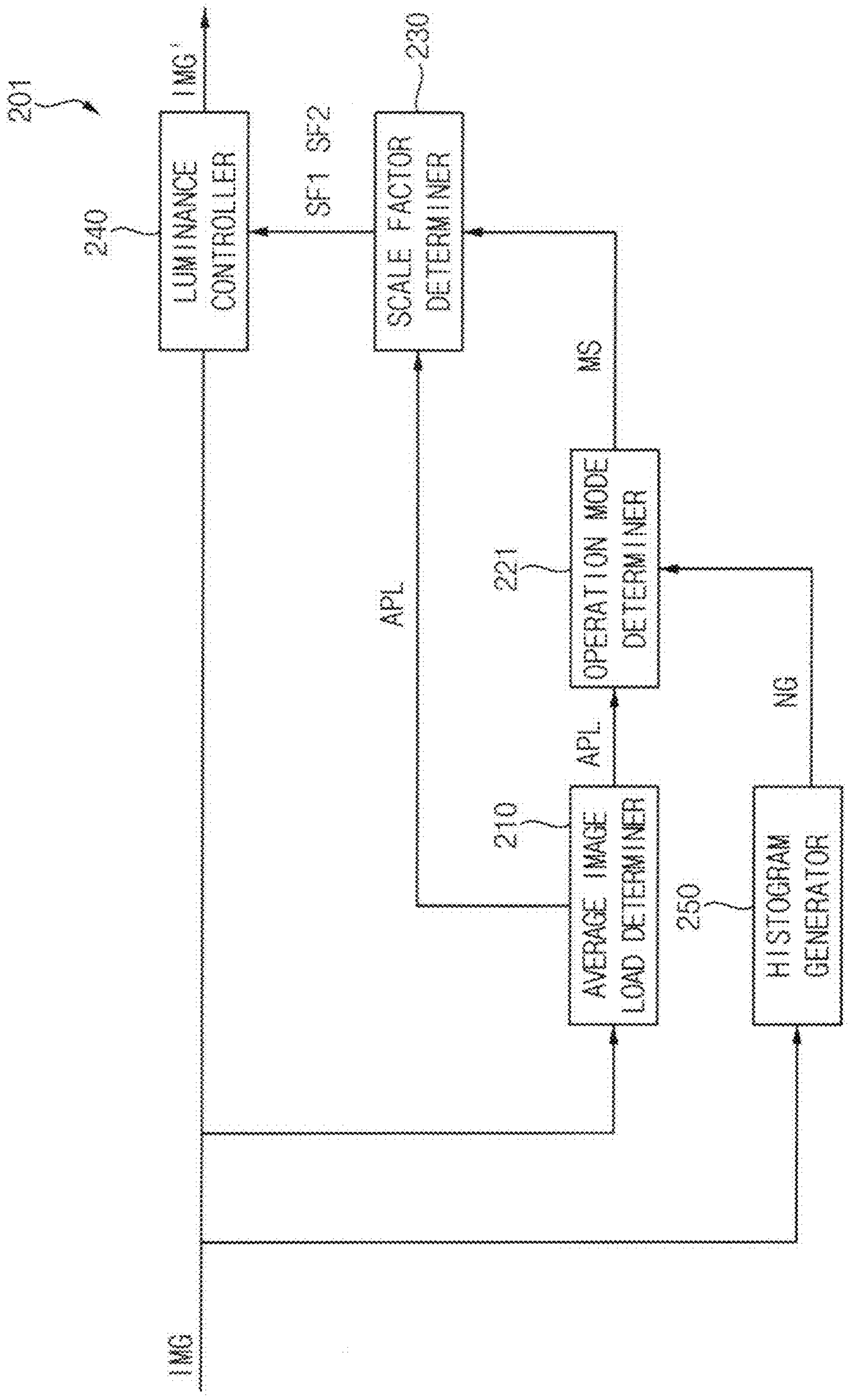
FIG. 2 is a block diagram illustrating an embodiment of a driving controller of the display device of FIG. 1.
Figure 3:
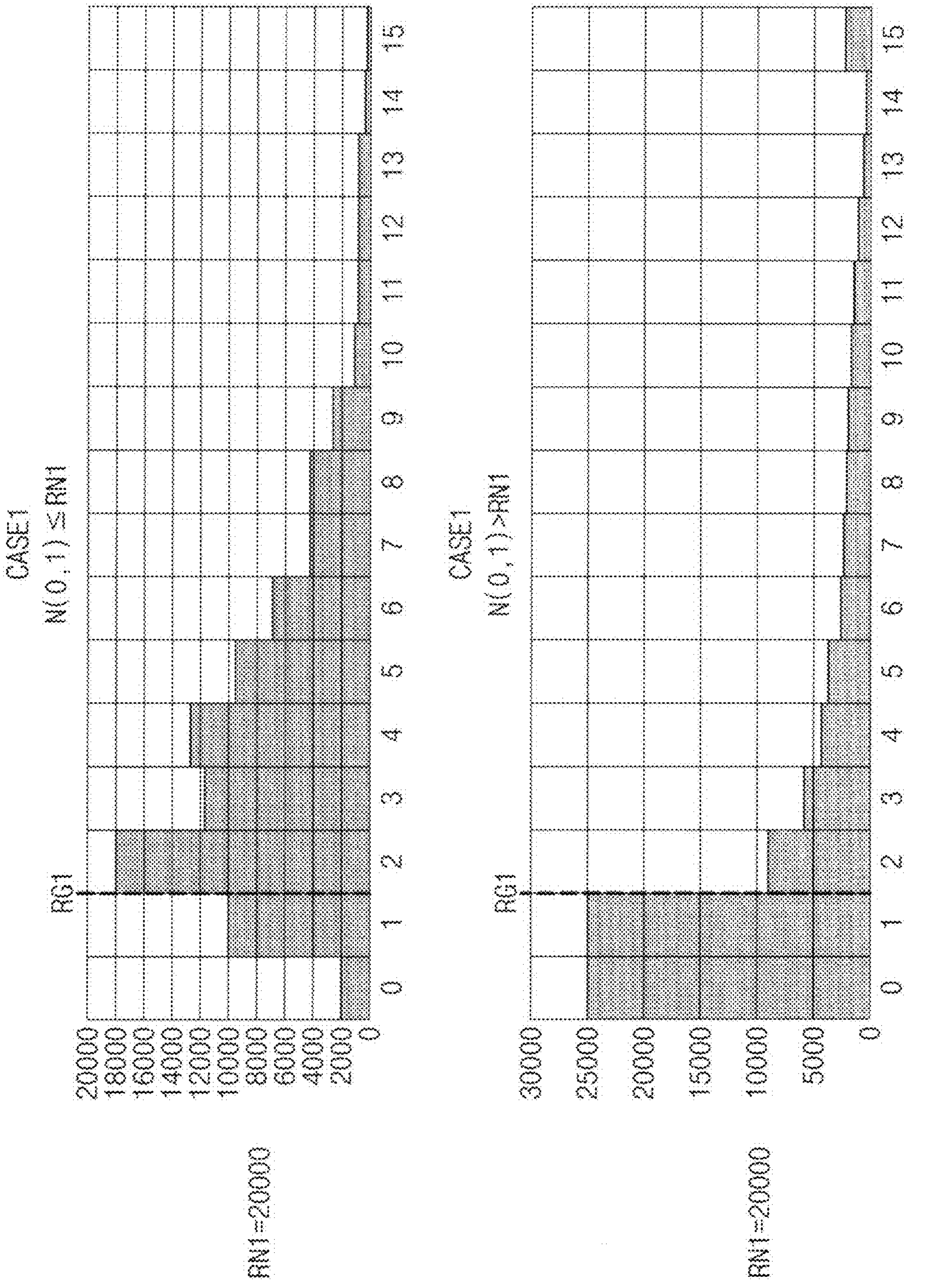
FIG. 3 is a diagram illustrating an embodiment of a histogram generated according to the display device of FIG. 1.
Figure 4:
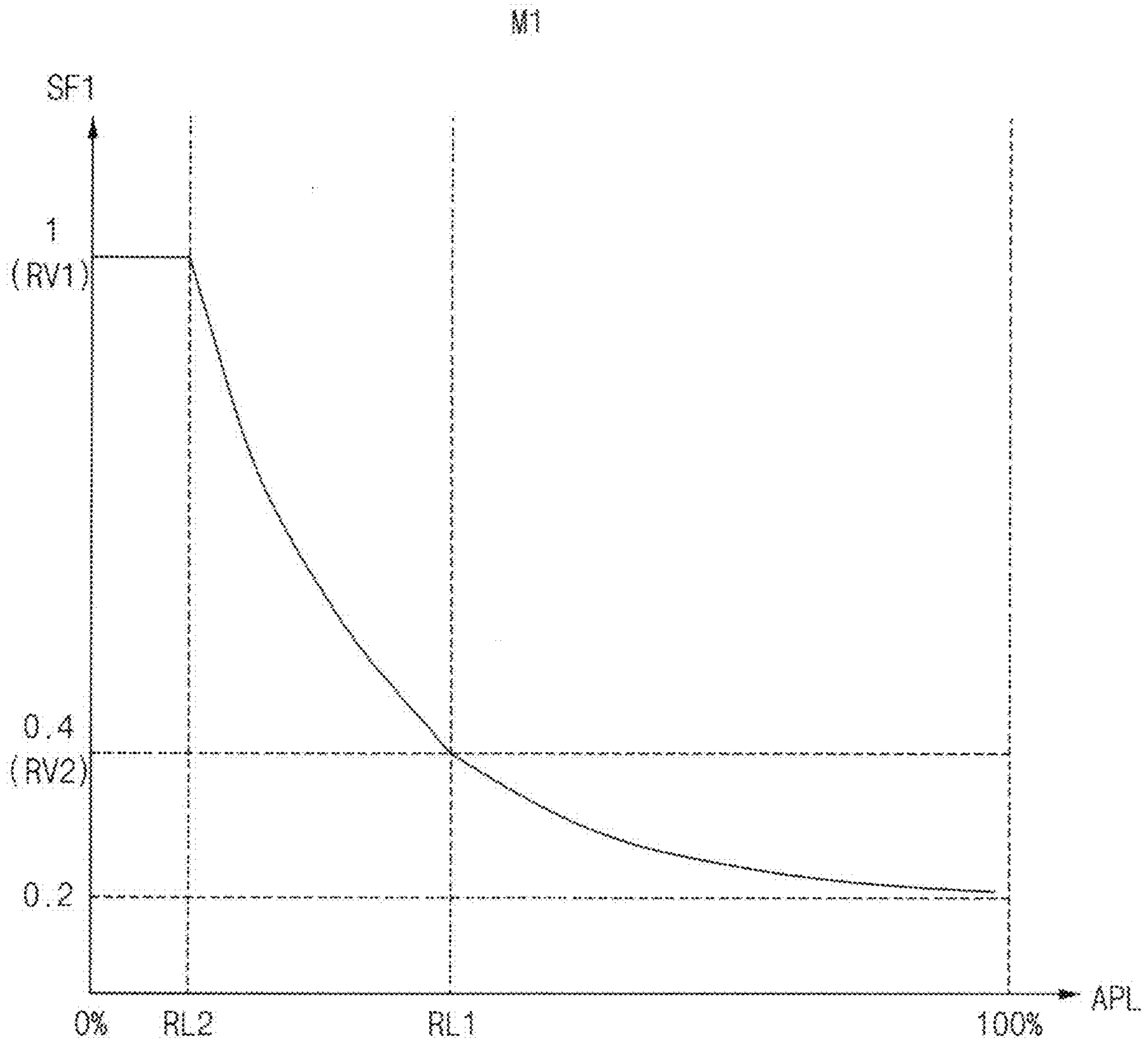
FIG. 4 is a graph illustrating an embodiment of a first scale factor of the display device of FIG. 1.
Figure 5:
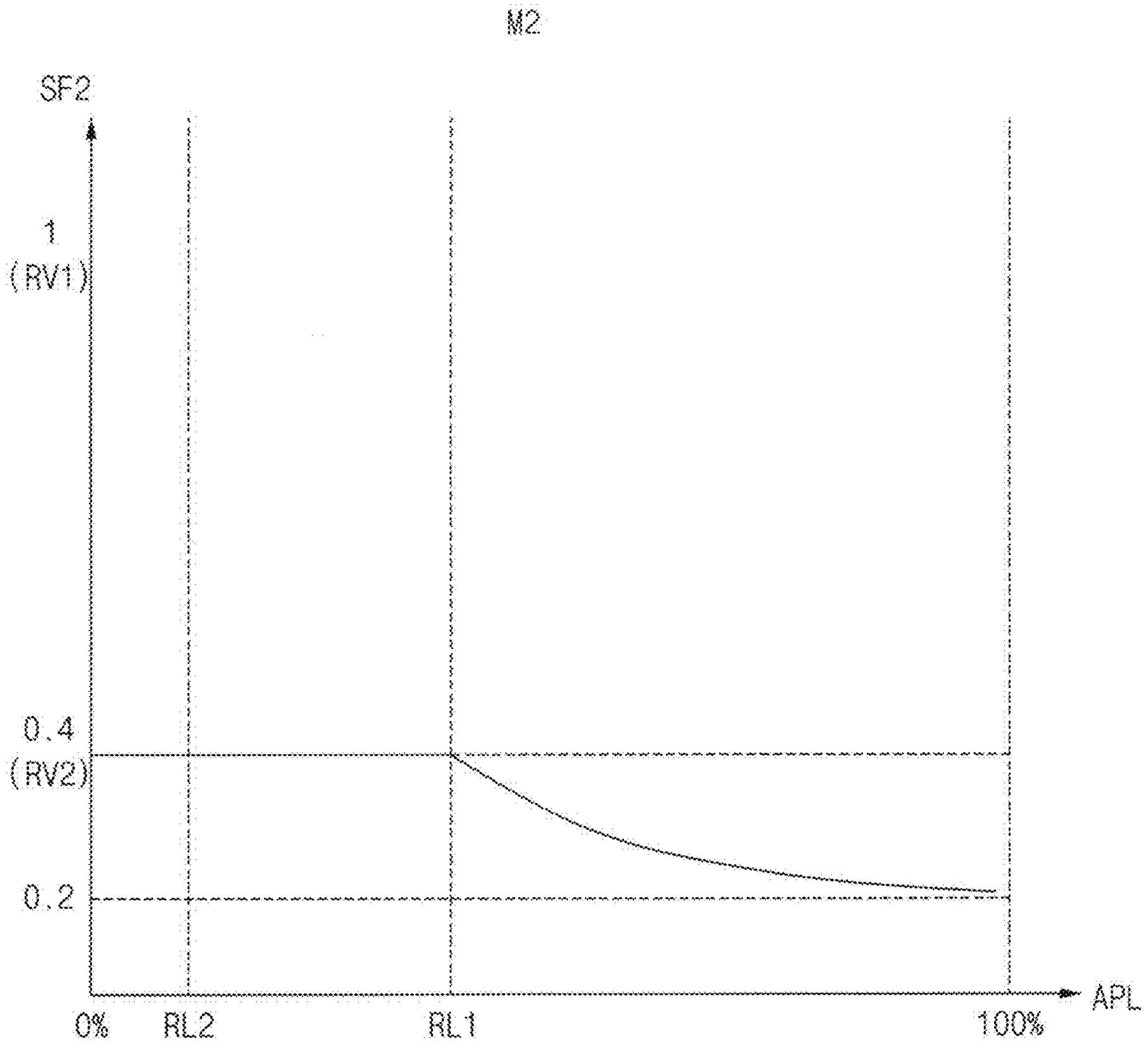
FIG. 5 is a graph illustrating an embodiment of a second scale factor of the display device of FIG. 1.

FIG. 2 is a block diagram illustrating an embodiment of a driving controller 201 of the display device 1000 of FIG. 1, FIG. 3 is a diagram illustrating an embodiment of a histogram generated according to the display device 1000 of FIG. 1, FIG. 4 is a graph illustrating an embodiment of a first scale factor SF1 of the display device 1000 of FIG. 1, and FIG. 5 is a graph illustrating an embodiment of a second scale factor SF2 of the display device 1000 of FIG. 1.

Referring to FIGS. 1 to 5, the display panel driver 10 may determine an average image load APL of the input image data IMG, determine an operation mode based on a grayscale value of the input image data IMG and the average image load APL as a first operation mode M1 or a second operation mode M2, apply the first scale factor SF1 to the input image data IMG in the first operation mode M1, and apply a second scale factor SF2 different from the first scale factor SF1 to the input image data IMG in the second operation mode M2.

In an embodiment, the display panel driver 10 may adjust the grayscale value of the input image data IMG by applying the first scale factor SF1 or the second scale factor SF2 to the input image data IMG, for example. Accordingly, luminance of a displayed image may be adjusted. A detailed description thereof will be given later.

The driving controller 201 may include an average image load determiner 210, an operation mode determiner 221, a scale factor determiner 230, and a luminance controller 240. In an embodiment, the driving controller 201 may further include a histogram generator 250.

The average image load determiner 210 may receive the input image data IMG and determine the average image load APL of the input image data IMG. In an embodiment, the average image load determiner 210 may convert the input image data IMG of a RGB domain into the input image data of a luminance domain, and determine the average image load APL by dividing a sum of luminance of the input image data IMG of the luminance domain (i.e., the sum of luminance to be displayed in all pixels P) by the number of the pixels P, for example.

The average image load APL may be normalized to have a value ranging from 0% to 100%. In an embodiment, when the input image data IMG is a full white image, the average image load APL may be 100%, for example. In an embodiment, when the input image data IMG is a full black image, the average image load APL may be 0%, for example.

The operation mode determiner 221 may determine the operation mode as the first operation mode M1 or the second operation mode M2 based on the gray scale value of the input image data IMG and the average image load APL. The display panel driver 10 may operate in the second operation mode M2 when the display panel driver 10 does not operate in the first operation mode M1, and operate in the first operation mode M1 when the display panel driver 10 does not operate in the second operation mode M2. In an embodiment, the display panel driver 10 may operate as the first operation mode M1 when the number NG of the pixels P displaying the grayscale value less than or equal to a first reference grayscale value RG1 is greater than a first reference number RN1 and the average image load APL is less than or equal to a first reference load RL1. In an embodiment, the display panel driver 10 may operate as the first operation mode M1 when the number NG of the pixels P displaying the grayscale value less than or equal to the first reference grayscale value RG1 is greater than the first reference number RN1 and the average image load APL is less than or equal to the first reference load RL1, operate as the second operation mode M2 when the number NG of the pixels P displaying the grayscale value less than or equal to the first reference grayscale value RG1 is less than or equal to the first reference number RN1 and the average image load APL is less than or equal to the first reference load RL1, operate as the second operation mode M2 when the number NG of the pixels P displaying the grayscale value less than or equal to the first reference grayscale value RG1 is greater than the first reference number RN1 and the average image load APL is greater than the first reference load RL1, and operate as the second operation mode M2 when the number NG of the pixels P displaying the grayscale value less than or equal to the first reference grayscale value RG1 is less than or equal to the first reference number RN1 and the average image load APL is greater than the first reference load RL1, for example. In an embodiment, the operation mode determiner 221 may output an operation mode signal MS including information on the operation mode to the scale factor determiner 230, for example. The first reference grayscale value RG1, the first reference number RN1, and the first reference load RL1 may be values set by a user.

The display panel driver 10 may generate the histogram for the grayscale value of the input image data IMG, and calculate the number NG of the pixels P displaying the grayscale value less than or equal to the first reference grayscale value RG1 based on the histogram.

In an embodiment, the histogram generator 250 may receive the input image data IMG and generate the histogram for the grayscale value of the input image data IMG, for example. The histogram generator 250 may use the histogram to calculate the number NG of the pixels P displaying the grayscale value less than or equal to the first reference grayscale value RG1. The operation mode determiner 221 may receive the number NG of the pixels P displaying the grayscale value less than or equal to the first reference grayscale value RG1 from the histogram generator 250. The operation mode determiner 221 may receive the average image load APL from the average image load determiner 210. The operation mode determiner 221 may determine the operation mode based on the average image load APL and the number NG of the pixels P displaying the grayscale value less than or equal to the first reference grayscale value RG1.

In an embodiment, referring to FIG. 3, the histogram generator 250 may divide the grayscale values of the input image data IMG into 16 sections, and generate the histogram representing the number of the pixels P displaying the grayscale value of each of sections, for example. It is assumed that sections including the grayscale value less than or equal to the first reference grayscale value RG1 are section 0 and section 1, and the first reference number RN1 is 20000. Referring to a first example (CASE 1), the number of the pixels P displaying the grayscale value of the section 0 is 2000, and the number of the pixels P displaying the grayscale value in the section 1 is 10000. That is, in the first example (CASE 1), the number (N(0,1)) of the pixels P displaying the grayscale value of the section 0 and the section 1 is 12000. Accordingly, the number (N(0,1)) of the pixels P displaying the grayscale value of section 0 and section 1 is less than the first reference number RN1. Referring to a second example (CASE 2), the number of the pixels P displaying the grayscale value of the section 0 is 25000, and the number of the pixels P displaying the grayscale value of the section 1 is 25000. That is, in the second example (CASE1), the number (N(0,1)) of the pixels P displaying the grayscale value of the section 0 and the section 1 is 50000. Accordingly, the number (N(0,1)) of the pixels P displaying the grayscale value of the section 0 and the section 1 is greater than the first reference number RN1.

The scale factor determiner 230 may operate in the first operation mode M1 or the second operation mode M2 in response to the operation mode signal MS. When operating in the first operation mode M1, the scale factor determiner 230 may generate the first scale factor SF1. When operating in the second operation mode M2, the scale factor determiner 230 may generate the second scale factor SF2.

The luminance controller 240 may apply the first scale factor SF1 to the input image data IMG in the first operation mode M1, and apply the second scale factor SF2 to the input image data IMG in the second operation mode M2. The luminance controller 240 may adjust the grayscale value of the input image data IMG by applying first and second scale factors SF1 and SF2 to the input image data IMG. That is, the luminance controller 240 may adjust the grayscale value of the input image data IMG so that luminance of the displayed image is adjusted by the first and second scale factors SF1 and SF2. In an embodiment, the luminance controller 240 may adjust the grayscale value of the input image data IMG so that a peak luminance of the displayed image is adjusted by the first and second scale factors SF1 and SF2.

The first and second scale factors SF1 and SF2 may have values between 0 and 1. Accordingly, the luminance controller 240 may lower the luminance of the displayed image by applying the first and second scale factors SF1 and SF2 to the input image data IMG.

In an embodiment, it is assumed that the luminance of the image is 1000 nit when displaying the image of 255 grayscale value, and the luminance of the image is 500 nit when displaying the image of 155 grayscale value 155G, for example. When the first scale factor SF1 or the second scale factor SF2 of 1 is applied to the input image data IMG of the 255 grayscale value, the luminance controller 240 may adjust the grayscale value of the input image data IMG so that the luminance of the image displayed by the input image data IMG of 255 grayscale value becomes $1000\times1=1000$ nit. Accordingly, the grayscale value of the input image data IMG' to which the first scale factor SF1 or the second scale factor SF2 is applied may be 255 grayscale value.

In an embodiment, it is assumed that the luminance of the image is 1000 nit when displaying the image of 255 grayscale value, and the luminance of the image is 500 nit when displaying the image of 155 grayscale value, for example. When the first scale factor SF1 of 0.5 or the second scale factor SF2 of 0.5 is applied to the input image data IMG of the 255 grayscale value, the luminance controller 240 may adjust the grayscale value of the input image data IMG so that the luminance of the image displayed by the input image data IMG of 255 grayscale value becomes $1000\times0.5=500$ nit. Accordingly, the grayscale value of the input image data IMG' to which the first scale factor SF1 or the second scale factor SF2 is applied may be 155 grayscale value 155G. As such, when the scale factor SF1 or the second scale factor SF2 less than 1 is applied to the input image data IMG, the luminance of the displayed image may be lowered.

The first scale factor SF1 may decrease as the average image load APL increases in a period in which the average image load APL is greater than or equal to a second reference load RL2, and may have a first reference value RV1 in a period in which the average image load APL is less than the second reference load RL2.

In an embodiment, as shown in FIG. 4, it is assumed that the first reference value RV1 is 1, a second reference value RV2 is 0.4, and a minimum value of the first scale factor SF1 is 0.2, for example. The first scale factor SF1 may decrease from 1 to 0.2 when the average image load APL is greater than or equal to the second reference load RL2. The first scale factor SF1 may be 1 when the average image load APL is less than the second reference load RL2.

The second scale factor SF2 may decrease as the average image load APL increases in a period in which the average image load APL is greater than or equal to the first reference load RL1 greater than the second reference load RL2, and may have the second reference value RV2 less than the first reference value RV1 in a period in which the average image load APL is less than the first reference load RL1.

In an embodiment, as shown in FIG. 5, it is assumed that the first reference value RV1 is 1, the second reference value RV2 is 0.4, and a minimum value of the second scale factor SF2 is 0.2, for example. The second scale factor SF2 may decrease from 0.4 to 0.2 when the average image load APL is greater than or equal to the first reference load RL1. The second scale factor SF2 may be 0.4 when the average image load APL is less than the second reference load RL2.

That is, in the second operation mode M2, the display panel driver 10 may adjust the luminance of the image displayed in a period in which the average image load APL is small (e.g., the average image load APL is less than or equal to the first reference load RL1) to be lower than that of the first operation mode M1.

As a result, even when the average image load APL is small, the display device 1000 may adjust the luminance of the image displayed through the second operation mode M2 to be low when the number of the pixels P displaying a low grayscale value (e.g., the grayscale value less than or equal to the first reference grayscale value RG1) is small (e.g., the number NG of the pixels P displaying the grayscale value less than or equal to the first reference grayscale value RG1 is less than or equal to the first reference number RN1). Also, even when the number of the pixels P displaying the low grayscale value is large (e.g., the number NG of the pixels P displaying the grayscale value less than or equal to the first reference grayscale value RG1 is greater than the first reference number RN1), the display device 1000 may adjust the luminance of the image displayed through the second operation mode M2 to be low when the average image load APL is large (e.g., the average image load APL is greater than the first reference load RL1).

Figure 6:
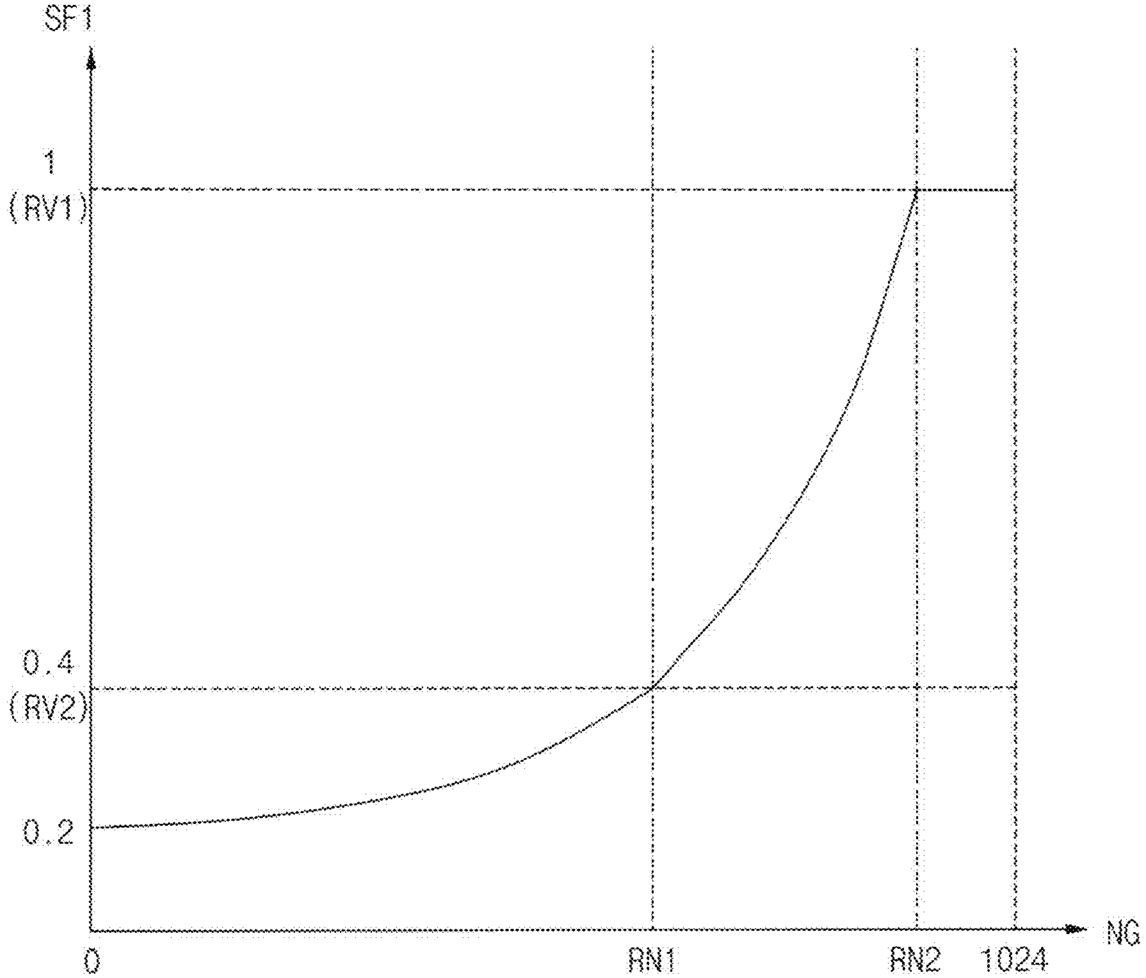
FIG. 6 is a graph illustrating an embodiment of a first scale factor of a display device according to the invention.
Figure 7:
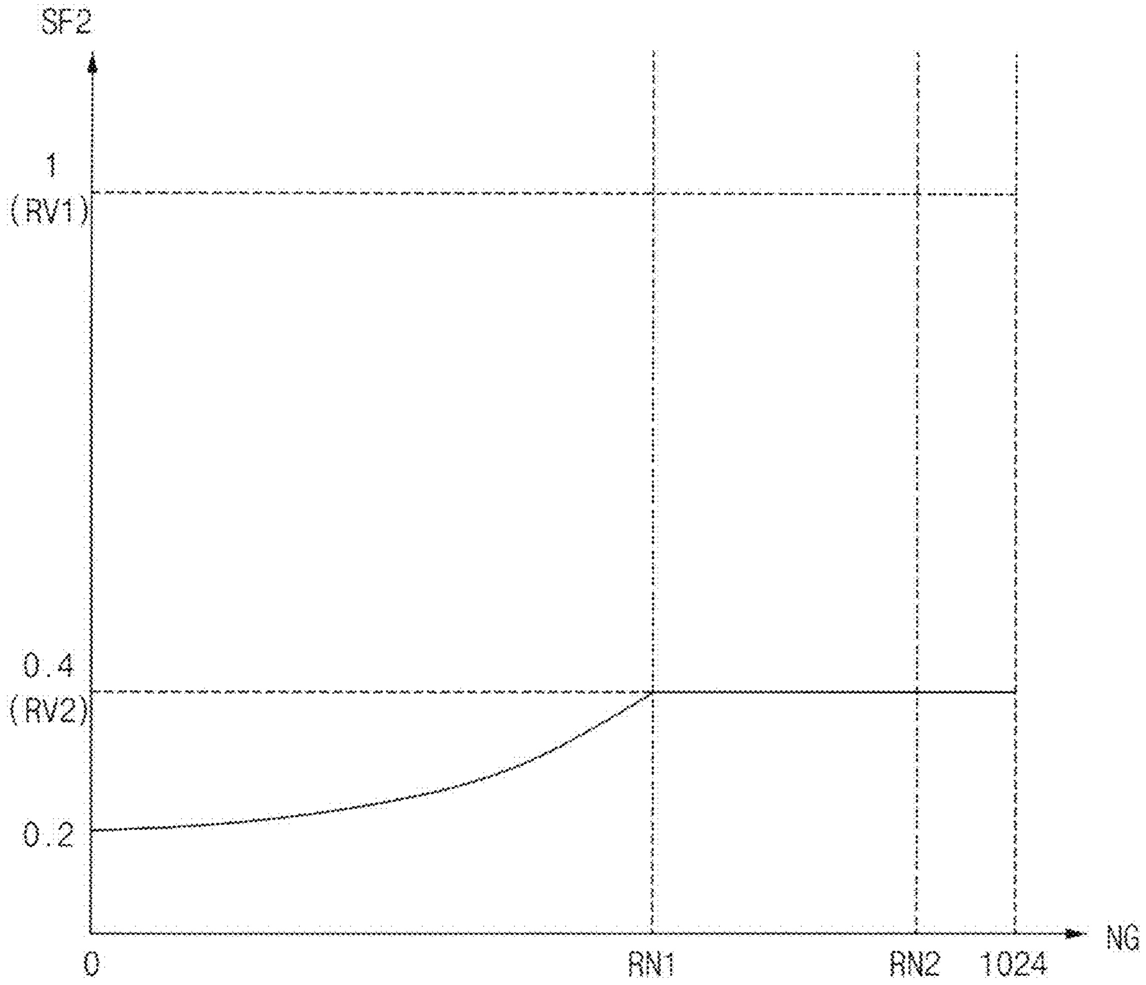
FIG. 7 is a graph illustrating an embodiment of a second scale factor of the display device of FIG. 6.

FIG. 6 is a graph illustrating an embodiment of the first scale factor SF1 of a display device according to the invention, and FIG. 7 is a graph illustrating an embodiment of the second scale factor SF2 of the display device of FIG. 6. In FIGS. 6 and 7, it is assumed that the number of all pixels P is 1024.

The display apparatus according to the illustrated embodiment is substantially the same as the display apparatus 1000 of FIG. 1 except for determining the first and second scale factors SF1 and SF2. Thus, the same reference numerals are used to refer to the same or similar element, and any repetitive explanation will be omitted.

Referring to FIGS. 6 and 7, the first scale factor SF1 may decrease as the number NG of the pixels P displaying the grayscale value less than or equal to the first reference grayscale value RG1 decreases in a period in which the number NG of the pixels P displaying the grayscale value less than or equal to the first reference grayscale value RG1 is less than or equal to a second reference number RN2, and may have the first reference value RV1 in a period in which the number NG of the pixels P displaying the grayscale value less than or equal to the first reference grayscale value RG1 is greater than the second reference number RN2. The second reference number RN2 may be a value set by a user.

In an embodiment, as shown in FIG. 6, it is assumed that the first reference value RV1 is 1, the second reference value RV2 is 0.4, and a minimum value of the first scale factor SF1 is 0.2, for example. The first scale factor SF1 may decrease from 1 to 0.2 when the number NG of the pixels P displaying the grayscale value less than or equal to the first reference grayscale value RG1 is less than or equal to the second reference number RN2. The first scale factor SF1 may be 1 when the number NG of the pixels P displaying the grayscale value less than or equal to the first reference grayscale value RG1 is greater than the second reference number RN2.

The second scale factor SF2 may decrease as the number of the pixels P displaying the grayscale value less than or equal to the first reference grayscale value RG1 decreases in a period in which the number NG of the pixels P displaying the grayscale value less than or equal to the first reference grayscale value RG1 is less than or equal to the first reference number RN1 less than the second reference number RN2, and may have the second reference value RV2 less than the first reference value RV1 in a period in which the number NG of the pixels P displaying the grayscale value less than or equal to the first reference grayscale value RG1 is greater than the first reference number RN1.

In an embodiment, as shown in FIG. 7, it is assumed that the first reference value RV1 is 1, the second reference value RV2 is 0.4, and a minimum value of the second scale factor SF2 is 0.2, for example. The second scale factor SF2 may decrease from 0.4 to 0.2 when the number NG of the pixels P displaying the grayscale value less than or equal to the first reference grayscale value RG1 is less than or equal to the first reference number RN1. The second scale factor SF2 may be 0.4 when the number NG of the pixels P displaying the grayscale value less than or equal to the first reference grayscale value RG1 is greater than the second reference number RN2.

Figure 8:
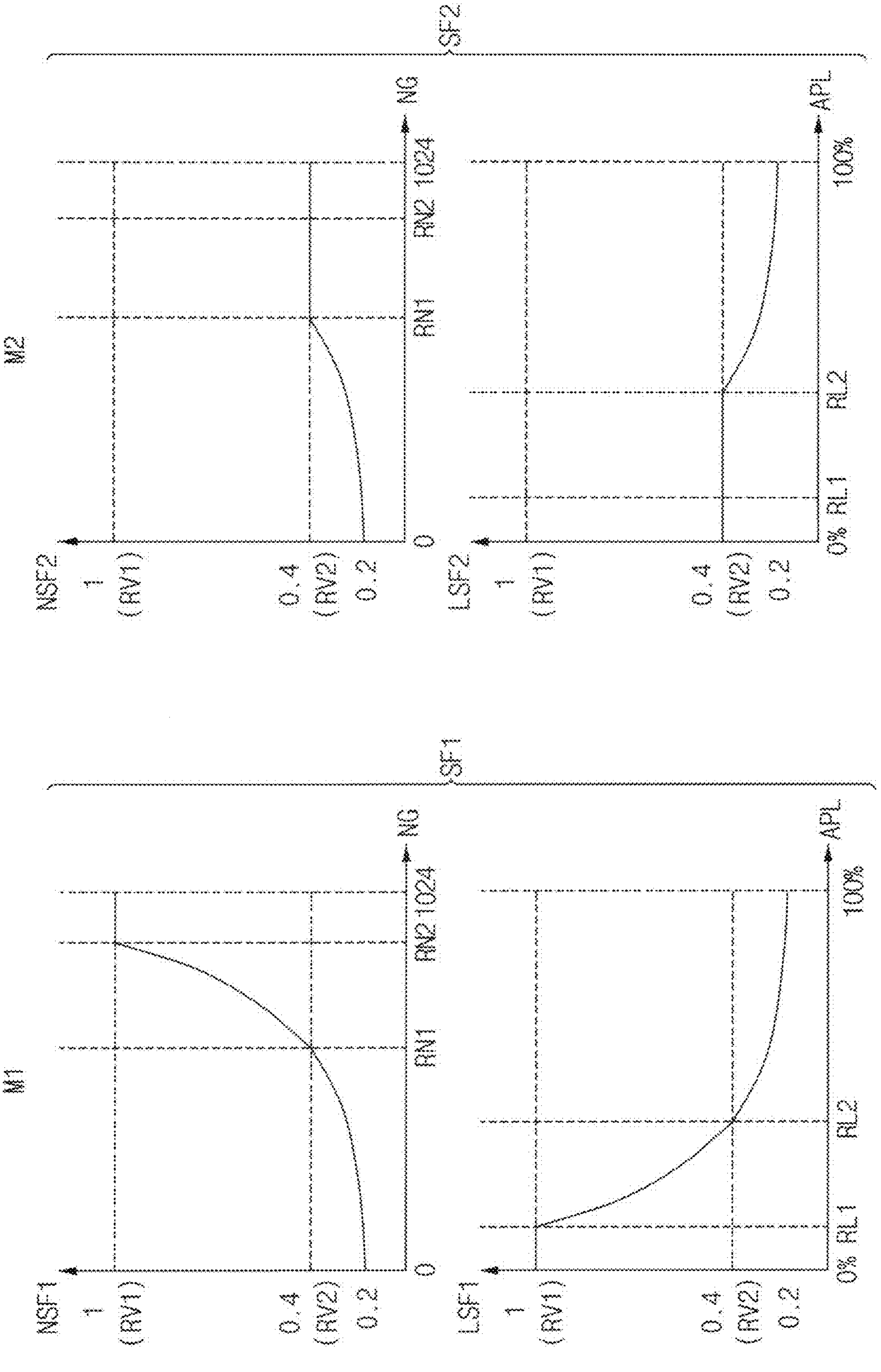
FIG. 8 is a diagram illustrating an embodiment in which a display device according to the invention determines a first scale factor and a second scale factor.

FIG. 8 is a diagram illustrating an embodiment in which a display device according to the invention determines the first scale factor SF1 and the second scale factor SF2.

The display apparatus according to the illustrated embodiment is substantially the same as the display apparatus 1000 of FIG. 1 except for determining the first and second scale factors SF1 and SF2. Thus, the same reference numerals are used to refer to the same or similar element, and any repetitive explanation will be omitted.

Referring to FIGS. 1 and 8, the display panel driver 10 may determine a first load scale factor LSF1 according to the average image load APL in the first operation mode M1, determine a first grayscale scale factor NSF1 according to the grayscale value of the input image data IMG in the first operation mode M1, and determine the first scale factor SF1 based on the first load scale factor LSF1 and the first grayscale scale factor NSF1.

In an embodiment, the first load scale factor LSF1 may be determined in the same manner as in FIG. 4, and the first grayscale scale factor NSF1 may be determined in the same manner as in FIG. 6, for example. In an embodiment, the display panel driver 10 may determine an average value of the first load scale factor LSF1 and the first grayscale scale factor NSF1 as the first scale factor SF1. In an embodiment, the display panel driver 10 may determine a minimum value of the first load scale factor LSF1 and the first grayscale scale factor NSF1 as the first scale factor SF1.

The display panel driver 10 may determine a second load scale factor LSF2 according to the average image load APL in the second operation mode M2, determine a second grayscale scale factor NSF2 according to the grayscale value of the input image data IMG in the second operation mode M2, and determine the second scale factor SF2 based on the second load scale factor LSF2 and the second grayscale scale factor NSF2.

In an embodiment, the second load scale factor LSF2 may be determined in the same manner as in FIG. 5, and the second grayscale scale factor NSF2 may be determined in the same manner as in FIG. 7, for example. In an embodiment, the display panel driver 10 may determine an average value of the second load scale factor LSF2 and the second grayscale scale factor NSF2 as the second scale factor SF2. In an embodiment, the display panel driver 10 may determine a minimum value of the second load scale factor LSF2 and the second grayscale scale factor NSF2 as the second scale factor SF2.

Figure 9:
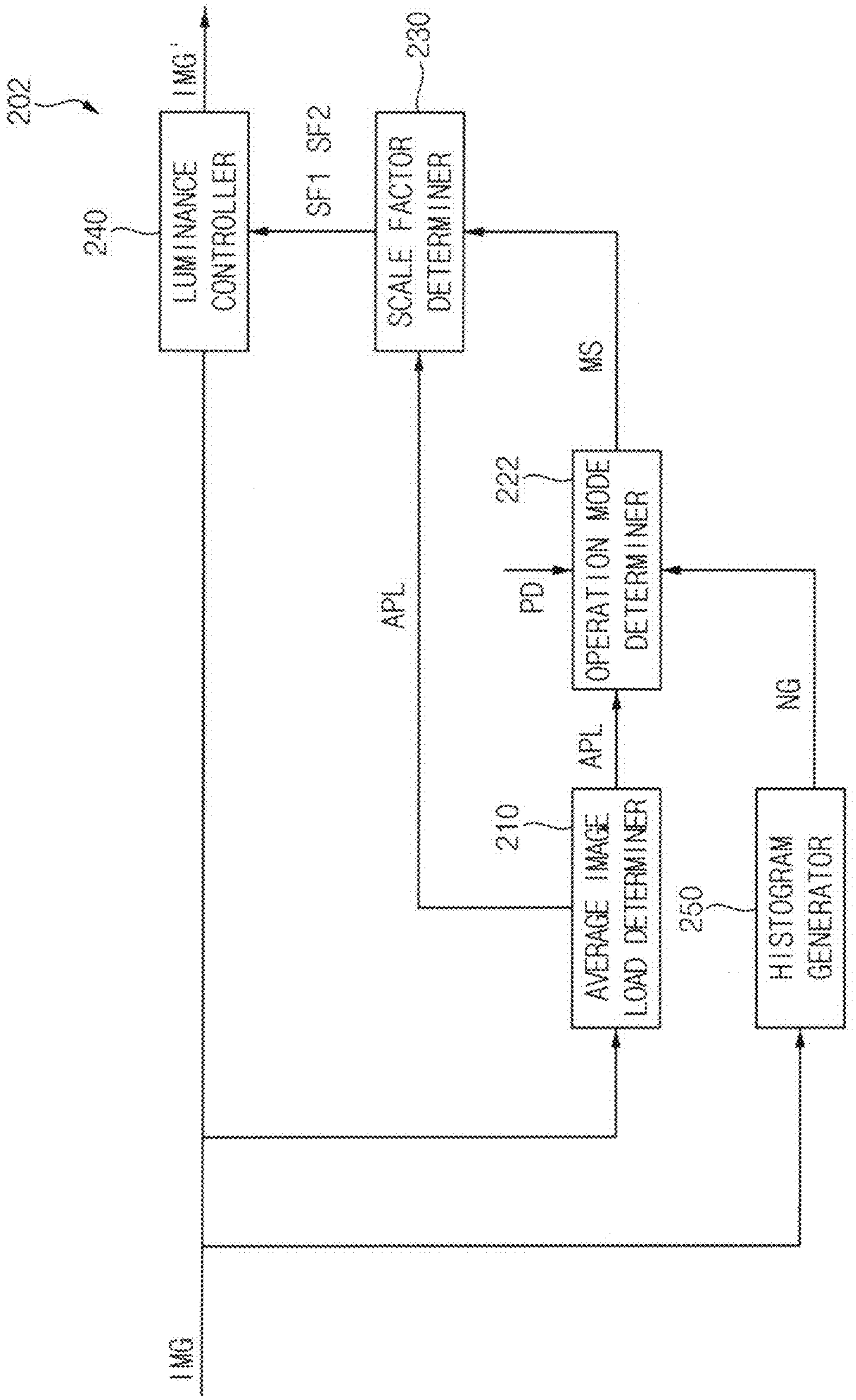
FIG. 9 is a block diagram illustrating an embodiment of a driving controller of a display device according to the invention.

FIG. 9 is a block diagram illustrating an embodiment of a driving controller 202 of a display device according to the invention.

The display apparatus according to the illustrated embodiment is substantially the same as the display apparatus 1000 of FIG. 1 except for the operation mode determiner 222. Thus, the same reference numerals are used to refer to the same or similar element, and any repetitive explanation will be omitted.

Referring to FIGS. 1, 4, 5, and 9, the display panel driver 10 may apply the second scale factor SF2 to the pixels P in which a deterioration degree PD of the pixels P is greater than a reference deterioration degree. In an embodiment, the display panel driver 10 may apply the second scale factor SF2 to the input image data IMG for an image displayed in the pixels P in which the deterioration degree PD of the pixels P is greater than the reference deterioration degree, for example. The reference deterioration degree may be a value set by a user.

The deterioration degree PD of the pixels P may be a degree of deterioration as the pixels P are driven. In an embodiment, the display panel driver 10 may sense a driving current of the pixels P to determine the degree of deterioration PD of the pixels P, for example. In an embodiment, the display panel driver 10 may determine the amount of deterioration due to the input image data IMG based on the input image data IMG, and accumulate the amount of deterioration due to the input image data IMG to determine the deterioration degree PD of the pixels P, for example.

The operation mode determiner 222 may receive the deterioration degree PD of the pixels P, and output the operation mode signal MS to apply the second scale factor SF2 to the pixels P in which the deterioration degree PD of the pixels P is greater than the reference deterioration degree. That is, the operation mode determiner 222 may output the operation mode signal MS of the second operation mode M2 with respect to the input image data IMG for an image displayed in the pixels P in which the deterioration degree PD of the pixels P is greater than the reference deterioration degree.

In an embodiment, when the number NG of the pixels P displaying the grayscale value less than or equal to the first reference grayscale value RG1 is greater than the first reference number RN1, and the average image load APL is less than or equal to the first reference load RL1, the second scale factor SF2 may be applied to the portion of the input image data IMG for the image displayed in the pixels P in which the deterioration degree PD of the pixels P is greater than the reference deterioration degree and the first scale factor SF1 may be applied to the portion of the input image data IMG for the image displayed in the pixels P in which the deterioration degree PD of the pixels P is less than or equal to the reference deterioration degree, for example.

Accordingly, in the first operation mode M1 in which the luminance of a displayed image is relatively higher than that of the second operation mode M2, the display panel driver 10 may convert the operation mode. So, the display device may prevent that an image having high luminance is displayed.

Figure 10:
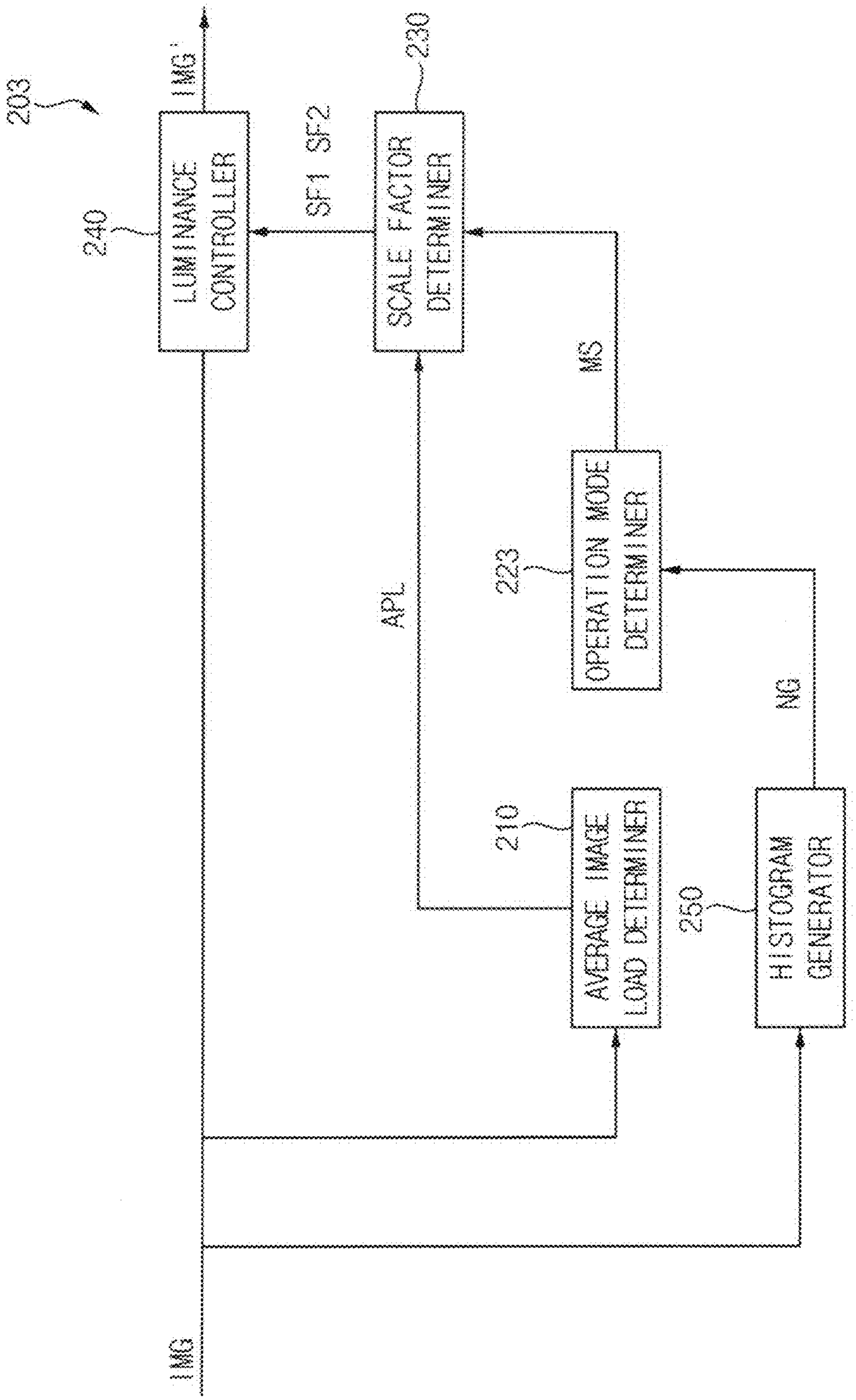
FIG. 10 is a block diagram illustrating an embodiment of a driving controller of a display device according to the invention.

FIG. 10 is a block diagram illustrating an embodiment of a driving controller 203 of a display device according to the invention.

The display apparatus according to the illustrated embodiment is substantially the same as the display apparatus 1000 of FIG. 1 except for the operation mode determiner 223. Thus, the same reference numerals are used to refer to the same or similar element, and any repetitive explanation will be omitted.

Referring to FIGS. 1, 4, 5, and 10, the operation mode determiner 223 may determine the operation mode as the first operation mode M1 or the second operation mode M2 based on the grayscale value of the input image data IMG. The display panel driver 10 may operate in the second operation mode M2 when the display panel driver 10 does not operate in the first operation mode M1, and operate in the first operation mode M1 when the display panel driver 10 does not operate in the second operation mode M2. In an embodiment, the display panel driver 10 may operate as the first operation mode M1 when the number NG of the pixels P displaying the grayscale value less than or equal to the first reference grayscale value RG1 is greater than the first reference number RN1. In an embodiment, the display panel driver 10 may operate as the first operation mode M1 when the number NG of the pixels P displaying the grayscale value less than or equal to the first reference grayscale value RG1 is greater than the first reference number RN1, and operate as the second operation mode M2 when the number NG of the pixels P displaying the grayscale value less than or equal to the first reference grayscale value RG1 is less than or equal to the first reference number RN1, for example. In an embodiment, the operation mode determiner 223 may output the operation mode signal MS including information on the operation mode to the scale factor determiner 230, for example.

As a result, even when the average image load APL is small, the display device 1000 may adjust the luminance of the image displayed through the second operation mode M2 to be low when the number of the pixels P displaying a low grayscale value is small.

Figure 11:
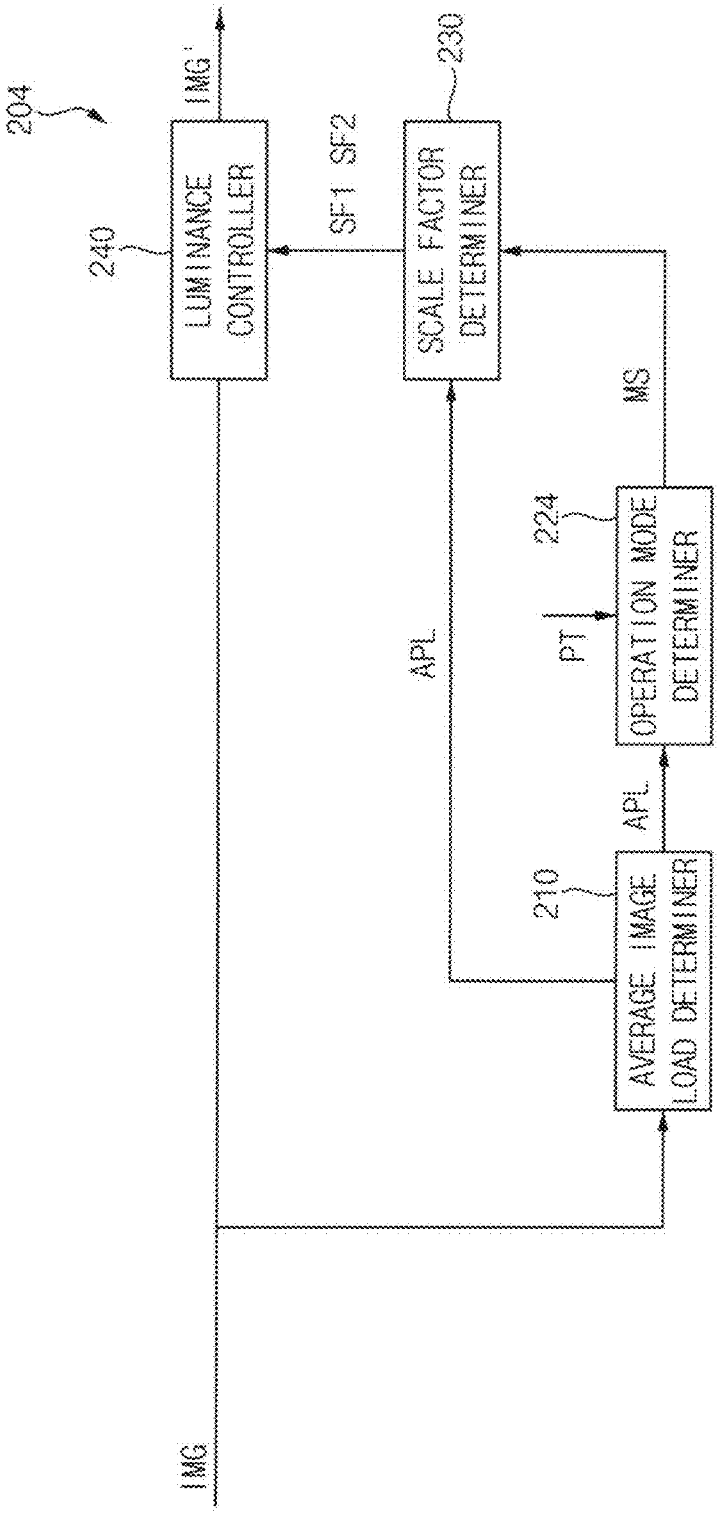
FIG. 11 is a block diagram illustrating an embodiment of a driving controller of a display device according to the invention.
Figure 12:
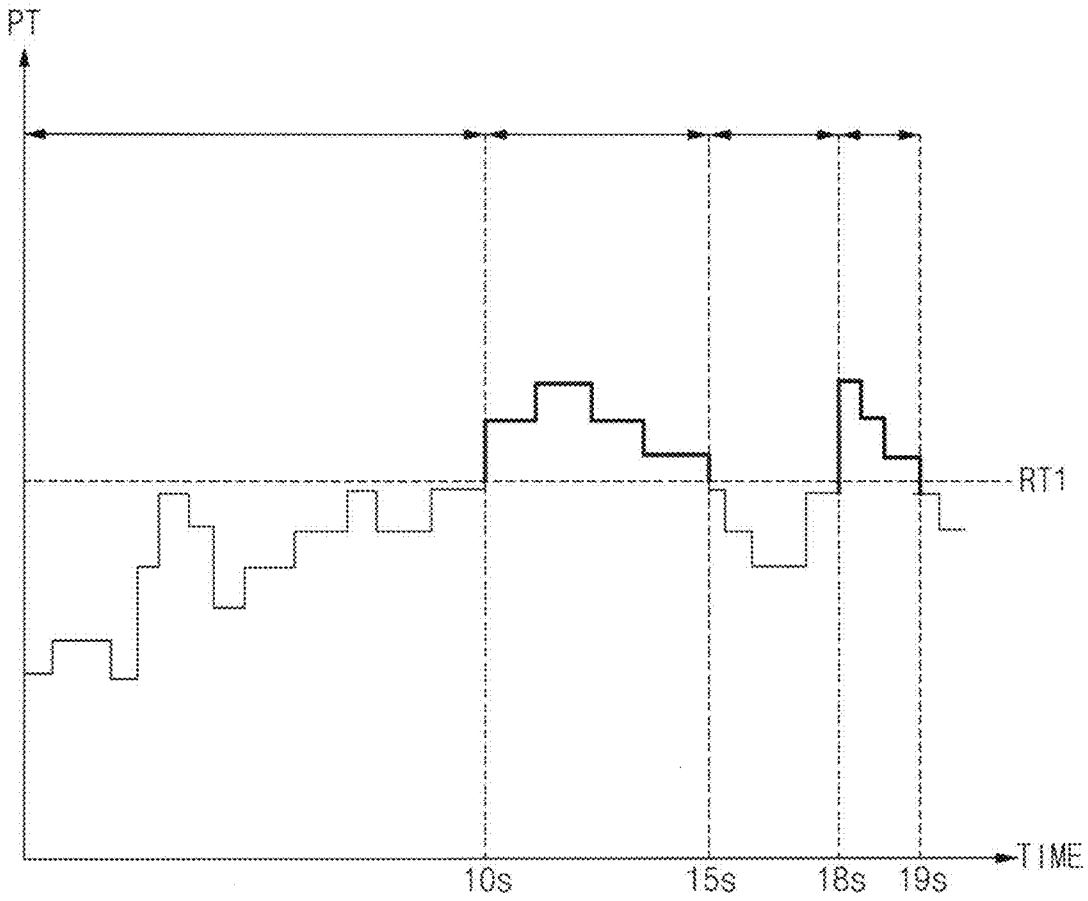
FIG. 12 is a diagram illustrating an embodiment of a temperature of a display panel.

FIG. 11 is a block diagram illustrating an embodiment of a driving controller 204 of a display device according to the invention, and FIG. 12 is a diagram illustrating an embodiment of a temperature PT of the display panel 100.

The display apparatus according to the illustrated embodiment is substantially the same as the display apparatus 1000 of FIG. 1 except for the operation mode determiner 224. Thus, the same reference numerals are used to refer to the same or similar element, and any repetitive explanation will be omitted.

Referring to FIGS. 1, 4, 5, 11, and 12, the operation mode determiner 224 may determine the operation mode as the first operation mode M1 or the second operation mode M2 based on the temperature PT of the display panel 100 and the average image load APL. The display panel driver 10 may operate in the second operation mode M2 when the display panel driver 10 does not operate in the first operation mode M1, and operate in the first operation mode M1 when the display panel driver 10 does not operate in the second operation mode M2. In an embodiment, the display panel driver 10 may operate as the first operation mode M1 when the temperature PT of the display panel 100 is lower than or equal to the first reference temperature RT1 and the average image load APL is less than or equal to the first reference load RL1. In an embodiment, the display panel driver 10 may operate as the first operation mode M1 when the temperature PT of the display panel 100 is lower than or equal to the first reference temperature RT1 and the average image load APL is less than or equal to the first reference load RL1, the display panel driver 10 may operate as the second operation mode M2 when the temperature PT of the display panel 100 is higher than the first reference temperature RT1 and the average image load APL is less than or equal to the first reference load RL1, the display panel driver 10 may operate as the second operation mode M2 when the temperature PT of the display panel 100 is lower than or equal to the first reference temperature RT1 and the average image load APL is greater than the first reference load RL1, and the display panel driver 10 may operate as the second operation mode M2 when the temperature PT of the display panel 100 is higher than the first reference temperature RT1 and the average image load APL is greater than the first reference load RL1, for example. In an embodiment, the operation mode determiner 224 may output the operation mode signal MS including information on the operation mode to the scale factor determiner 230, for example. The first reference temperature RT1 may be value set by a user.

In an embodiment, the display panel driver 10 may determine the temperature PT of the display panel 100 by accumulating the input image data IMG, for example. The display panel driver 10 may calculate a change amount of the temperature PT of the display panel 100 based on the input image data IMG. That is, the display panel driver 10 may calculate the change amount of the temperature PT of the display panel 100 based on the accumulated input image data IMG, and determine the temperature PT of the display panel 100 using the change amount of the temperature PT of the display panel 100.

In an embodiment, the display panel driver 10 may sense the driving current of the pixels P to determine the temperature PT of the display panel 100, for example. As the temperature PT of the display panel 100 changes, the driving current of the pixels P may change. Accordingly, the display panel driver 10 may sense the driving current of the pixels P and determine the temperature PT of the display panel 100 through the sensed driving current.

In an embodiment, as shown in FIG. 12, it is assumed that the temperature PT of the display panel 100 is higher than the first reference temperature RT1 in periods between a time point at 10 seconds (s) and a time point at 15 s and between a time point at 18 s and a time point at 19 s, and the average image load APL is less than or equal to the first reference load RL1, for example. In this case, the display panel driver may operate in the first operation mode M1 from a time point at 0 s to the time point at 10 s, operate in the second operation mode M2 from the time point at 10 s to the time point at 15 s, and operate in the first operation mode M1 from the time point at 15 s to the time point at 18 s and operate in the second operation mode M2 from the time point at 18 s to the time point at 19 s.

As a result, even when the average image load APL is small, the display device 1000 may adjust the luminance of the image displayed through the second operation mode M2 to be low when the temperature PT of the display panel 100 is high (i.e., the temperature PT of the display panel 100 is higher than the first reference temperature RT1.).

Figure 13:
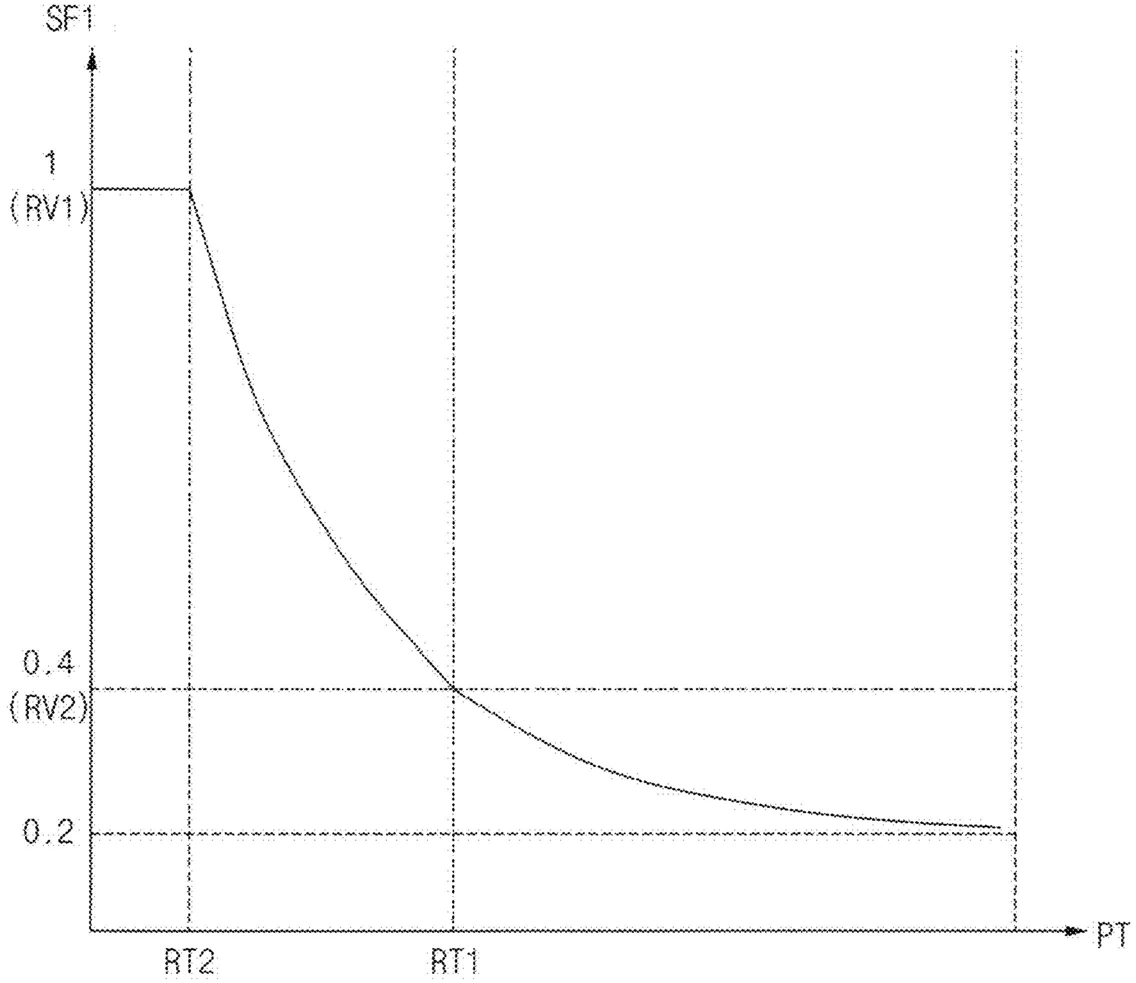
FIG. 13 is a graph illustrating an embodiment of a first scale factor of a display device according to the invention.
Figure 14:
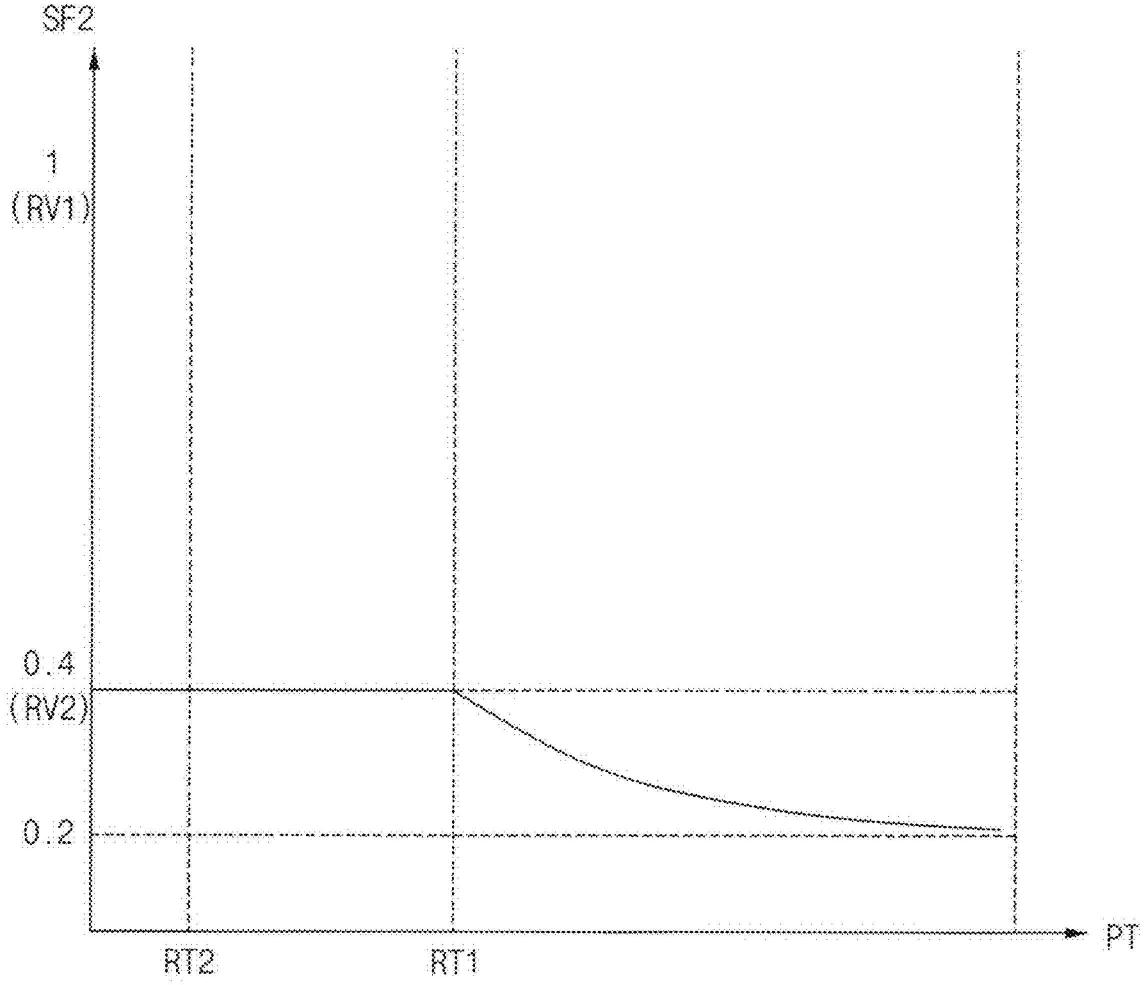
FIG. 14 is a graph illustrating an embodiment of a second scale factor of the display device of FIG. 13.

FIG. 13 is a graph illustrating an embodiment of the first scale factor SF1 of the display device 100 according to the invention, and FIG. 14 is a graph illustrating an embodiment of the second scale factor SF2 of the display device of FIG. 13.

The display apparatus according to the illustrated embodiment is substantially the same as the display apparatus of FIG. 11 except for determining the first and second scale factors SF1 and SF2. Thus, the same reference numerals are used to refer to the same or similar element, and any repetitive explanation will be omitted.

Referring to FIGS. 1, 4, 5, 13, and 14, the first scale factor SF1 may decrease as the temperature PT of the display panel 100 increases in a period in which the temperature PT of the display panel 100 is higher than or equal to a second reference temperature RT2, and has the first reference value RV1 in a period in which the temperature PT of the display panel 100 is lower than the second reference temperature RT2. The second reference temperature RT2 may be value set by a user.

In an embodiment, as shown in FIG. 13, it is assumed that the first reference value RV1 is 1, the second reference value RV2 is 0.4, and a minimum value of the first scale factor SF1 is 0.2, for example. The first scale factor SF1 may decrease from 1 to 0.2 when the temperature PT of the display panel 100 is higher than or equal to the second reference temperature RT2. The first scale factor SF1 may be 1 when the temperature PT of the display panel 100 is less than the second reference temperature RT2.

The second scale factor SF2 may decrease as the temperature PT of the display panel 100 increases in a period in which the temperature PT of the display panel 100 is higher than the first reference temperature RT1 higher than the second reference temperature RT2, and has the second reference value RV2 less than the first reference value RV1 in a period in which the temperature PT of the display panel 100 is lower than the first reference temperature RT1.

In an embodiment, as shown in FIG. 14, it is assumed that the first reference value RV1 is 1, the second reference value RV2 is 0.4, and a minimum value of the second scale factor SF2 is 0.2, for example. The second scale factor SF2 may decrease from 0.4 to 0.2 when the temperature PT of the display panel 100 is higher than or equal to the first reference temperature RT1. The second scale factor SF2 may be 0.4 when the temperature PT of the display panel 100 is lower than the second reference temperature RT2.

Figure 15:
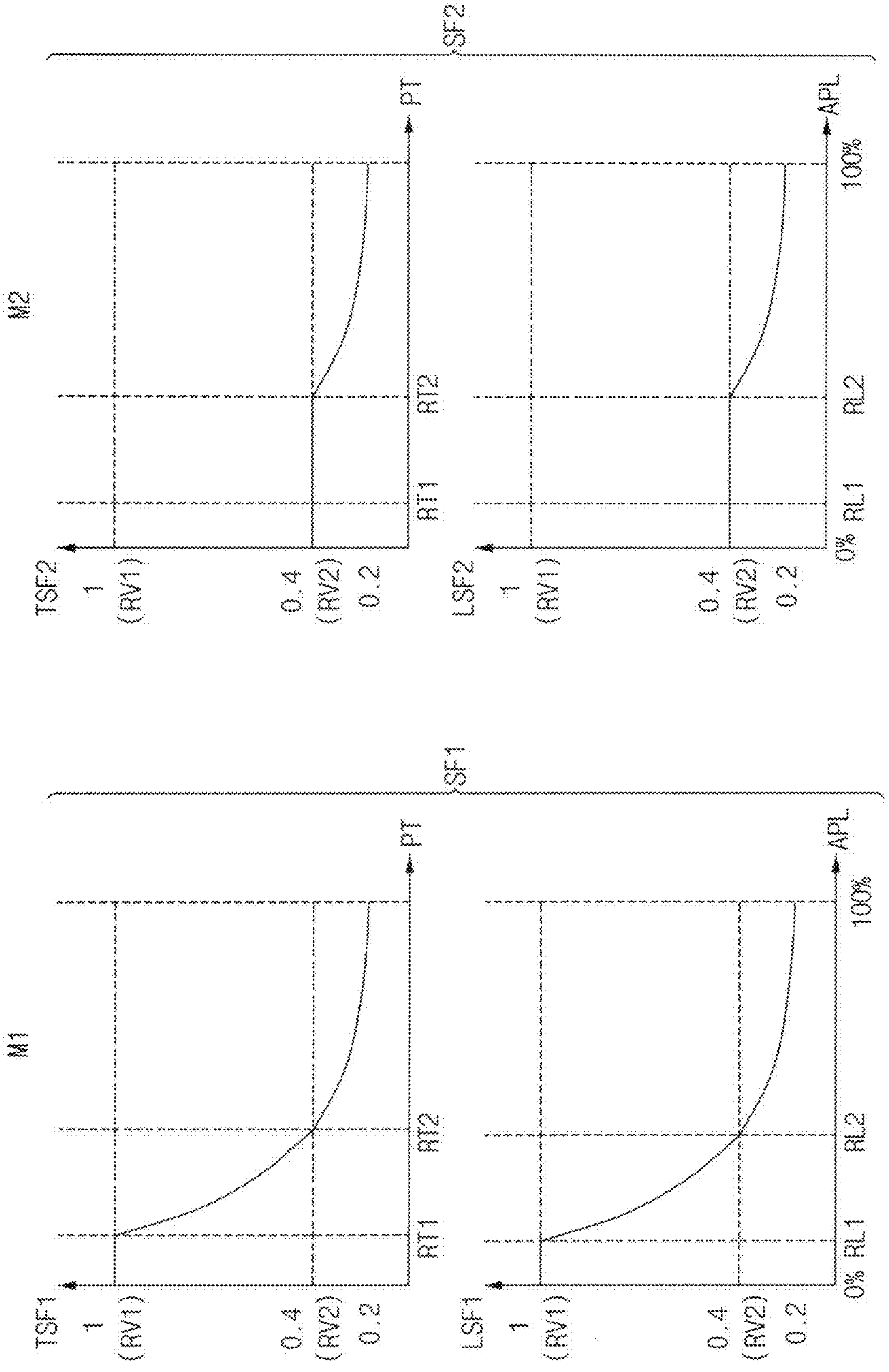
FIG. 15 is a diagram illustrating an embodiment in which a display device according to the invention determines a first scale factor and a second scale factor.

FIG. 15 is a diagram illustrating an embodiment in which a display device according to the invention determines the first scale factor SF1 and the second scale factor SF2.

The display apparatus according to the illustrated embodiment is substantially the same as the display apparatus of FIG. 11 except for determining the first and second scale factors SF1 and SF2. Thus, the same reference numerals are used to refer to the same or similar element, and any repetitive explanation will be omitted.

Referring to FIGS. 1 and 15, the display panel driver 10 may determine the first load scale factor LSF1 according to the average image load APL in the first operation mode M1, determine a first temperature scale factor TSF1 according to the temperature PT of the display panel 100 in the first operation mode M1, and determine the first scale factor SF1 based on the first load scale factor LSF1 and the first temperature scale factor TSF1.

In an embodiment, the first load scale factor LSF1 may be determined in the same manner as in FIG. 4, and the first temperature scale factor TSF1 may be determined in the same manner as in FIG. 13, for example. In an embodiment, the display panel driver 10 may determine an average value of the first load scale factor LSF1 and the first temperature scale factor TSF1 as the first scale factor SF1. In an embodiment, the display panel driver 10 may determine a minimum value of the first load scale factor LSF1 and the first temperature scale factor TSF1 as the first scale factor SF1.

The display panel driver 10 may determine the second load scale factor LSF2 according to the average image load APL in the second operation mode M2, determine a second temperature scale factor TSF2 according to the temperature PT of the display panel 100 in the second operation mode M2, and determine the second scale factor SF2 based on the second load scale factor LSF2 and the second temperature scale factor TSF2.

In an embodiment, the second load scale factor LSF2 may be determined in the same manner as in FIG. 5, and the second temperature scale factor TSF2 may be determined in the same manner as in FIG. 14, for example. In an embodiment, the display panel driver 10 may determine an average value of the second load scale factor LSF2 and the second temperature scale factor TSF2 as the second scale factor SF2. In an embodiment, the display panel driver 10 may determine a minimum value of the second load scale factor LSF2 and the second temperature scale factor TSF2 as the second scale factor SF2.

Figure 16:
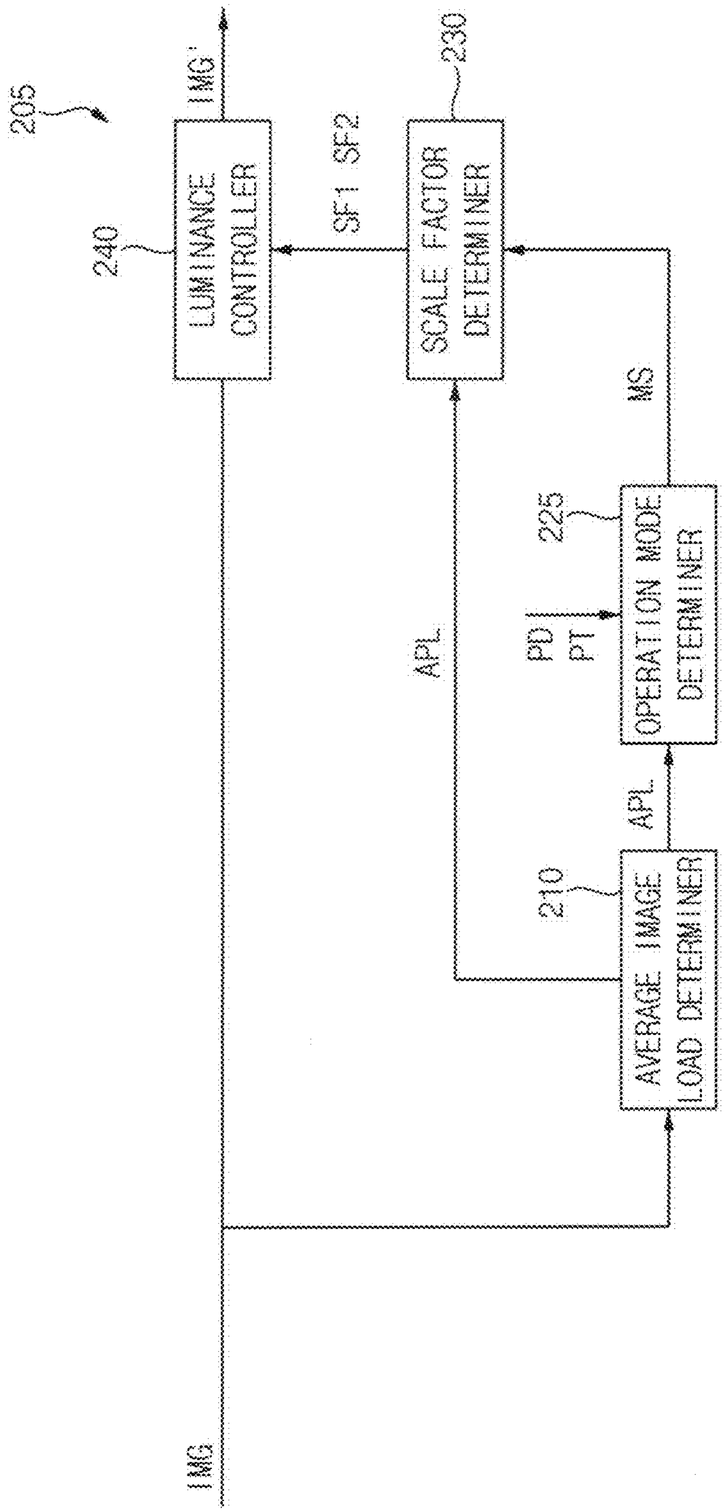
FIG. 16 is a block diagram illustrating an embodiment of a driving controller of a display device according to the invention.

FIG. 16 is a block diagram illustrating an embodiment of a driving controller 205 of a display device according to the invention.

The display apparatus according to the illustrated embodiment is substantially the same as the display apparatus of FIG. 11 except for the operation mode determiner 225. Thus, the same reference numerals are used to refer to the same or similar element, and any repetitive explanation will be omitted.

Referring to FIGS. 1, 4, 5, 12, and 16, the display panel driver 10 may apply the second scale factor SF2 to the pixels P in which the deterioration degree PD of the pixels P is greater than the reference deterioration degree. In an embodiment, the display panel driver 10 may apply the second scale factor SF2 to the input image data IMG for an image displayed in the pixels P in which the deterioration degree PD of the pixels P is greater than the reference deterioration degree, for example.

In an embodiment, when the temperature PT of the display panel 100 is lower than or equal to the first reference temperature RT1, and the average image load APL is less than or equal to the first reference load RL1, the second scale factor SF2 may be applied to the portion of the input image data IMG for the image displayed in the pixels P in which the deterioration degree PD of the pixels P is greater than the reference deterioration degree and the first scale factor SF1 may be applied to the portion of the input image data IMG for the image displayed in the pixels P in which the deterioration degree PD of the pixels P is less than or equal to the reference deterioration degree, for example.

Figure 17:
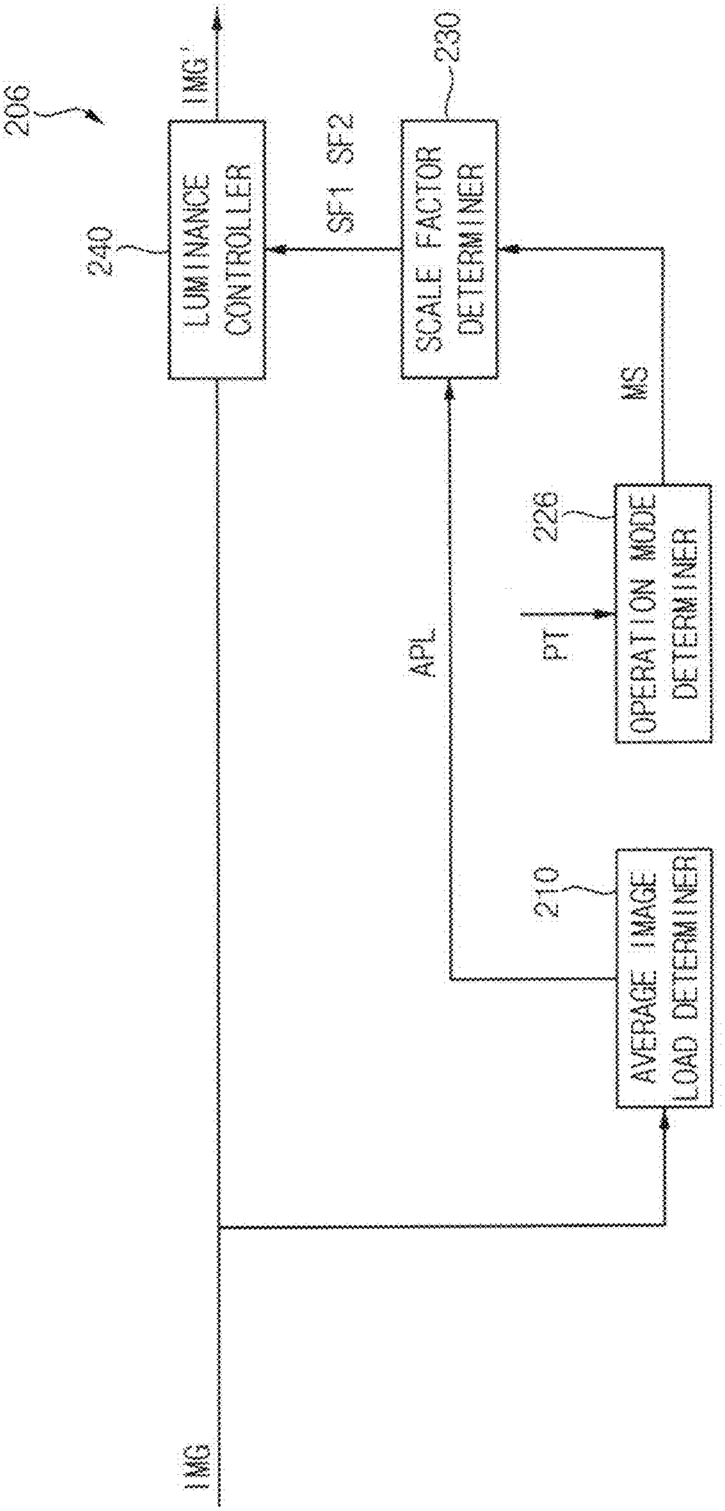
FIG. 17 is a block diagram illustrating an embodiment of a driving controller of a display device according to the invention.

FIG. 17 is a block diagram illustrating an embodiment of a driving controller 206 of a display device according to the invention.

The display apparatus according to the illustrated embodiment is substantially the same as the display apparatus of FIG. 11 except for the operation mode determiner 226. Thus, the same reference numerals are used to refer to the same or similar element, and any repetitive explanation will be omitted.

Referring to FIGS. 1, 4, 5, 12, and 17, the operation mode determiner 226 may determine the operation mode as the first operation mode M1 or the second operation mode M2 based on the temperature PT of the display panel 100. The display panel driver 10 may operate in the second operation mode M2 when the display panel driver 10 does not operate in the first operation mode M1, and operate in the first operation mode M1 when the display panel driver 10 does not operate in the second operation mode M2. In an embodiment, the display panel driver 10 may operate as the first operation mode M1 when the temperature PT of the display panel 100 is lower than or equal to the first reference temperature RT1. In an embodiment, the display panel driver 10 may operate as the first operation mode M1 when the temperature PT of the display panel 100 is lower than or equal to the first reference temperature RT1, and the display panel driver 10 may operate as the second operation mode M2 when the temperature PT of the display panel 100 is higher than the first reference temperature RT1, for example. In an embodiment, the operation mode determiner 226 may output the operation mode signal MS including information on the operation mode to the scale factor determiner 230, for example.

As a result, even when the average image load APL is small, the display device 1000 may adjust the luminance of the image displayed through the second operation mode M2 to be low when the temperature PT of the display panel 100 is high.

Figure 18:
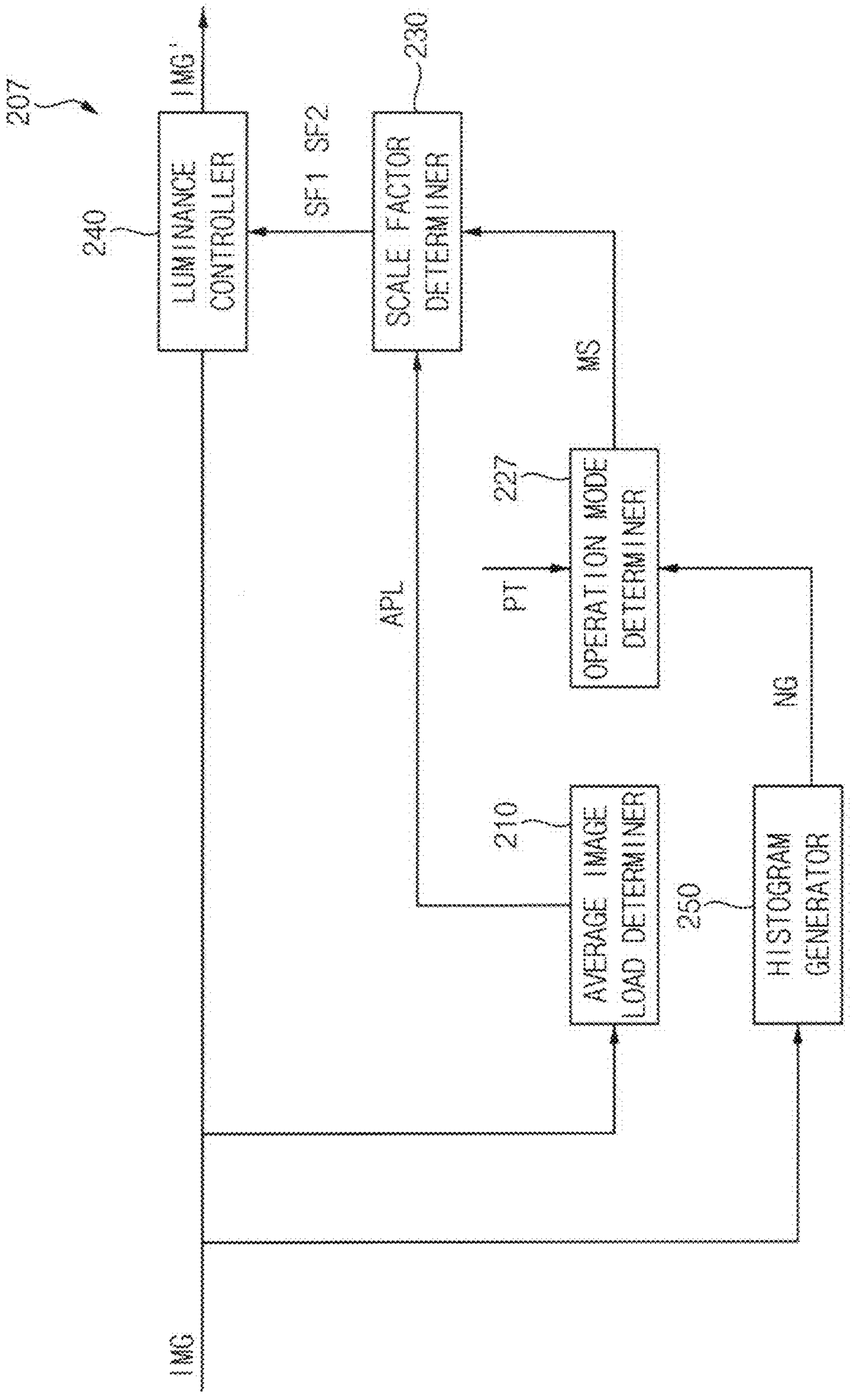
FIG. 18 is a block diagram illustrating an embodiment of a driving controller of a display device according to the invention.

FIG. 18 is a block diagram illustrating an embodiment of a driving controller 207 of a display device according to the invention.

The display apparatus according to the illustrated embodiment is substantially the same as the display apparatus of FIG. 11 except for determining the operation mode. Thus, the same reference numerals are used to refer to the same or similar element, and any repetitive explanation will be omitted.

Referring to FIGS. 1, 4, 5, 12, and 18, the display panel driver 10 may determine the operation mode as the first operation mode M1 or the second operation mode M2 based on the temperature PT of the display panel 100 and the grayscale value of the input image data IMG, apply the first scale factor SF1 to the input image data IMG in the first operation mode M1, and apply the second scale factor SF2 to the input image data IMG in the second operation mode M2.

The operation mode determiner 227 may determine the operation mode as the first operation mode M1 or the second operation mode M2 based on the temperature PT of the display panel 100 and the grayscale value of the input image data IMG. The display panel driver 10 may operate in the second operation mode M2 when the display panel driver 10 does not operate in the first operation mode M1, and operate in the first operation mode M1 when the display panel driver 10 does not operate in the second operation mode M2. In an embodiment, the display panel driver 10 may operate as the first operation mode M1 when the number NG of the pixels P displaying the grayscale value less than or equal to the first reference grayscale value RG1 is greater than the first reference number RN1 and the temperature PT of the display panel 100 less than or equal to the first reference temperature RT1. In an embodiment, the display panel driver 10 may operate as the first operation mode M1 when the number NG of the pixels P displaying the grayscale value less than or equal to the first reference grayscale value RG1 is greater than the first reference number RN1 and the temperature PT of the display panel 100 less than or equal to the first reference temperature RT1, the display panel driver 10 may operate as the second operation mode M2 when the number NG of the pixels P displaying the grayscale value less than or equal to the first reference grayscale value RG1 is less than or equal to the first reference number RN1 and the temperature PT of the display panel 100 less than or equal to the first reference temperature RT1, the display panel driver 10 may operate as the second operation mode M2 when the number NG of the pixels P displaying the grayscale value less than or equal to the first reference grayscale value RG1 is greater than the first reference number RN1 and the temperature PT of the display panel 100 higher than the first reference temperature RT1, the display panel driver 10 may operate as the second operation mode M2 when the number NG of the pixels P displaying the grayscale value less than or equal to the first reference grayscale value RG1 is less than or equal to the first reference number RN1 and the temperature PT of the display panel 100 higher than the first reference temperature RT1, for example. In an embodiment, the operation mode determiner 227 may output the operation mode signal MS including information on the operation mode to the scale factor determiner 230, for example.

As a result, even when the temperature PT of the display panel 100 is low, the display device 1000 may adjust the luminance of the image displayed through the second operation mode M2 to be low when the number of the pixels P displaying the low grayscale value is small. Also, even when the number of the pixels P displaying the low grayscale value is small, the display device 1000 may adjust the luminance of the image displayed through the second operation mode M2 to be low when the temperature PT of the display panel 100 is high.

In an embodiment, the display panel driver 10 determine the first grayscale scale factor according to the grayscale value of the input image data IMG in the first operation mode M1, determine the first temperature scale factor according to the temperature PT of the display panel 100 in the first operation mode M1, and determine the first scale factor SF1 based on the first grayscale scale factor and the first temperature scale factor.

In an embodiment, the first grayscale scale factor may be determined in the same manner as in FIG. 6, and the first temperature scale factor may be determined in the same manner as in FIG. 13, for example. In an embodiment, the display panel driver 10 may determine an average value of the first grayscale scale factor and the first temperature scale factor as the first scale factor SF1. In an embodiment, the display panel driver 10 may determine a minimum value of the first grayscale scale factor and the first temperature scale factor as the first scale factor SF1.

In an embodiment, the display panel driver 10 may determine the second grayscale scale factor according to the grayscale value of the input image data IMG in the second operation mode M2, determine the second temperature scale factor according to the temperature PT of the display panel 100 in the second operation mode M2, and determine the second scale factor SF2 based on the second grayscale scale factor and the second temperature scale factor.

In an embodiment, the second grayscale scale factor may be determined in the same manner as in FIG. 7, and the second temperature scale factor may be determined in the same manner as in FIG. 14, for example. In an embodiment, the display panel driver 10 may determine an average value of the second grayscale scale factor and the second temperature scale factor as the second scale factor SF2. In an embodiment, the display panel driver 10 may determine a minimum value of the second grayscale scale factor and the second temperature scale factor as the second scale factor SF2.

Figure 19:
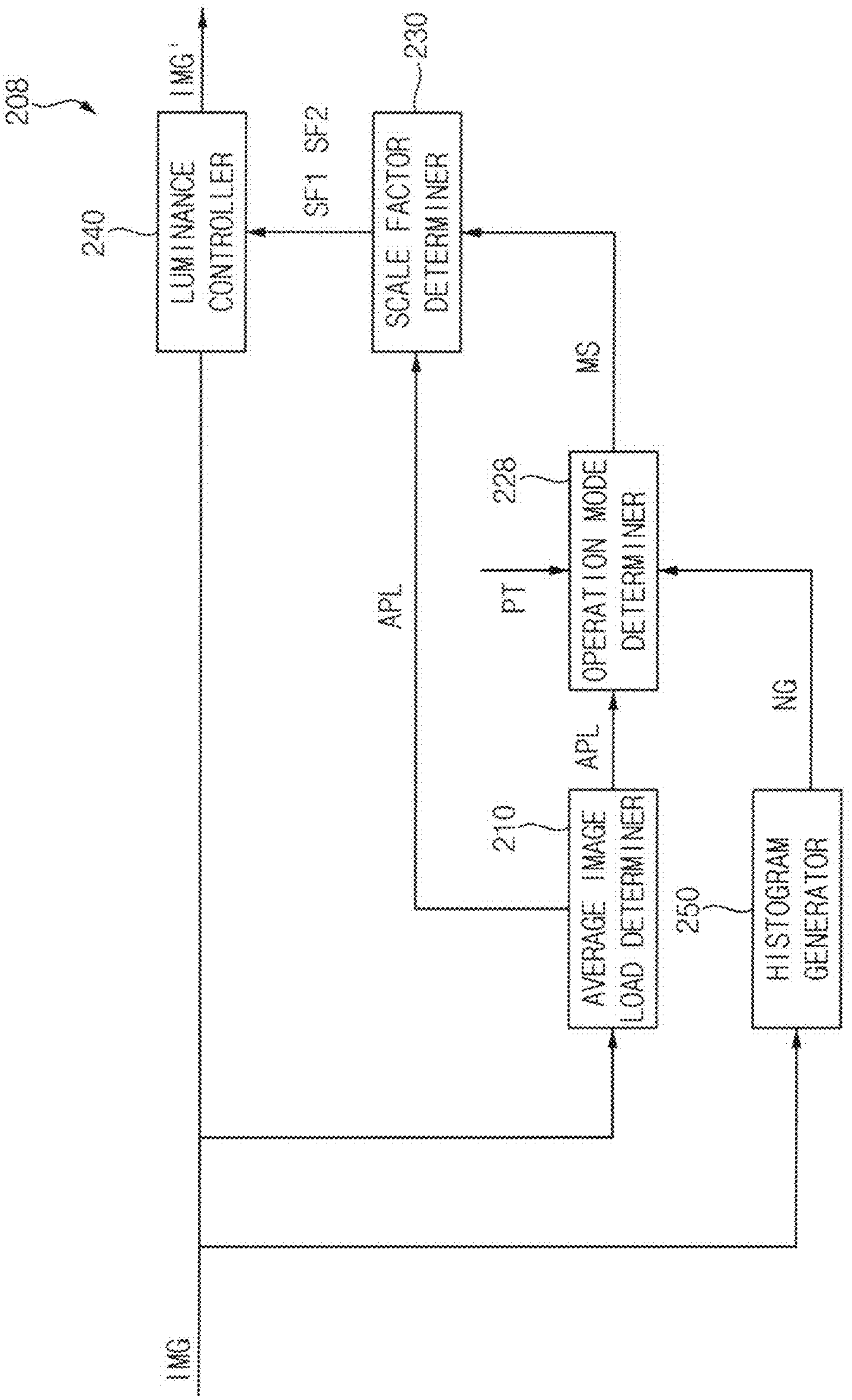
FIG. 19 is a block diagram illustrating an embodiment of a driving controller of a display device according to the invention.

FIG. 19 is a block diagram illustrating an embodiment of a driving controller 208 of a display device according to the invention.

The display apparatus according to the illustrated embodiment is substantially the same as the display apparatus of FIG. 11 except for the operation mode determiner 228. Thus, the same reference numerals are used to refer to the same or similar element, and any repetitive explanation will be omitted.

The operation mode determiner 228 may determine the operation mode as the first operation mode M1 or the second operation mode M2 based on the average image load APL, the temperature PT of the display panel 100, and the grayscale value of the input image data IMG. The display panel driver 10 may operate in the second operation mode M2 when the display panel driver 10 does not operate in the first operation mode M1, and operate in the first operation mode M1 when the display panel driver 10 does not operate in the second operation mode M2. In an embodiment, the display panel driver 10 may operate as the first operation mode M1 when the number NG of the pixels P displaying the grayscale value less than or equal to the first reference grayscale value RG1 is greater than the first reference number RN1, the temperature PT of the display panel 100 is lower than or equal to the first reference temperature RT1, and the average image load APL is less than or equal to the first reference load RL1. In an embodiment, the display panel driver 10 may operate as the first operation mode M1 when the number NG of the pixels P displaying the grayscale value less than or equal to the first reference grayscale value RG1 is greater than the first reference number RN1, the temperature PT of the display panel 100 is lower than or equal to the first reference temperature RT1, and the average image load APL is less than or equal to the first reference load RL1, the display panel driver 10 may operate as the second operation mode M2 when the number NG of the pixels P displaying the grayscale value less than or equal to the first reference grayscale value RG1 is less than or equal to the first reference number RN1, the temperature PT of the display panel 100 is lower than or equal to the first reference temperature RT1, and the average image load APL is less than or equal to the first reference load RL1, the display panel driver 10 may operate as the second operation mode M2 when the number NG of the pixels P displaying the grayscale value less than or equal to the first reference grayscale value RG1 is greater than the first reference number RN1, the temperature PT of the display panel 100 is higher than the first reference temperature RT1, and the average image load APL is less than or equal to the first reference load RL1, the display panel driver 10 may operate as the second operation mode M2 when the number NG of the pixels P displaying the grayscale value less than or equal to the first reference grayscale value RG1 is greater than the first reference number RN1, the temperature PT of the display panel 100 is lower than or equal to the first reference temperature RT1, and the average image load APL is greater than the first reference load RL1, the display panel driver 10 may operate as the second operation mode M2 when the number NG of the pixels P displaying the grayscale value less than or equal to the first reference grayscale value RG1 is less than or equal to the first reference number RN1, the temperature PT of the display panel 100 is higher than the first reference temperature RT1, and the average image load APL is less than or equal to the first reference load RL1, the display panel driver 10 may operate as the second operation mode M2 when the number NG of the pixels P displaying the grayscale value less than or equal to the first reference grayscale value RG1 is less than or equal to the first reference number RN1, the temperature PT of the display panel 100 is lower than or equal to the first reference temperature RT1, and the average image load APL is greater than the first reference load RL1, the display panel driver 10 may operate as the second operation mode M2 when the number NG of the pixels P displaying the grayscale value less than or equal to the first reference grayscale value RG1 is greater than the first reference number RN1, the temperature PT of the display panel 100 is higher than the first reference temperature RT1, and the average image load APL is greater than the first reference load RL1, and the display panel driver 10 may operate as the second operation mode M2 when the number NG of the pixels P displaying the grayscale value less than or equal to the first reference grayscale value RG1 is less than or equal to the first reference number RN1, the temperature PT of the display panel 100 is higher the first reference temperature RT1, and the average image load APL is greater than the first reference load RL1, for example. In an embodiment, the operation mode determiner 228 may output the operation mode signal MS including information on the operation mode to the scale factor determiner 230, for example.

As a result, even when the number of the pixels P displaying the low grayscale value is small and the temperature PT of the display panel 100 is low, the display device 1000 may adjust the luminance of the image displayed through the second operation mode M2 to be low when the average image load APL is large. Also, even when the temperature PT of the display panel 100 is low and the average image load APL is small, the display device 1000 may adjust the luminance of the image displayed through the second operation mode M2 to be low when the number of the pixels P displaying a low grayscale value is small. Also, even when the average image load APL is small and the number of the pixels P displaying the low grayscale value is small large, the display device 1000 may adjust the luminance of the image displayed through the second operation mode M2 to be low when the temperature PT of the display panel 100 is high.

Figure 20:
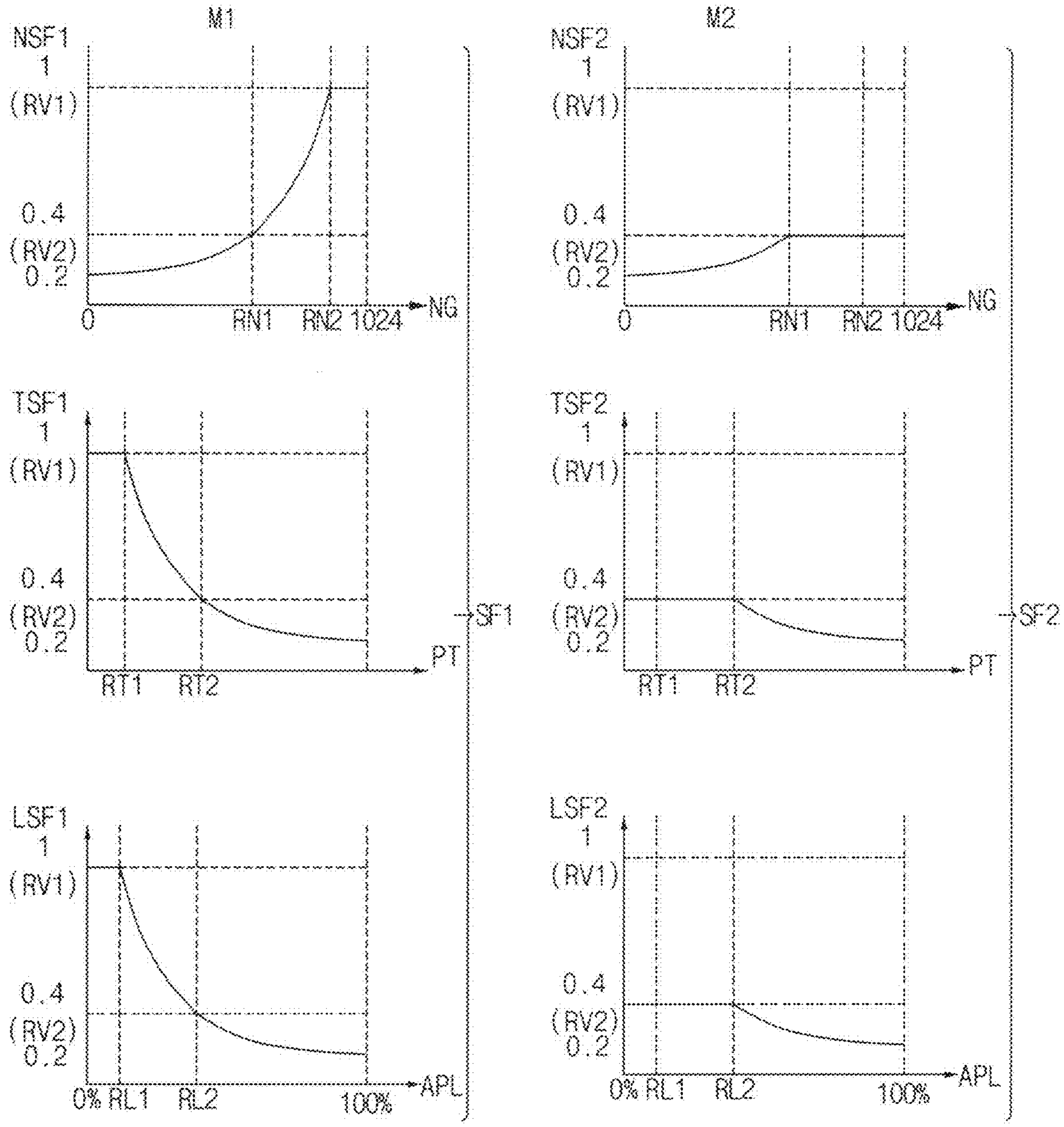
FIG. 20 is a diagram illustrating an embodiment in which a display device according to the invention determines a first scale factor and a second scale factor.

FIG. 20 is a diagram illustrating an embodiment in which a display device according to the invention determines the first scale factor SF1 and the second scale factor SF2.

The display apparatus according to the illustrated embodiment is substantially the same as the display apparatus of FIG. 11 except for determining the first and second scale factors SF1 and SF2. Thus, the same reference numerals are used to refer to the same or similar element, and any repetitive explanation will be omitted.

Referring to FIGS. 1 and 20, the display panel driver 10 may determine the first load scale factor LSF1 according to the average image load APL in the first operation mode M1, determine the first grayscale scale factor NSF1 according to the grayscale value of the input image data IMG in the first operation mode M1, determine the first temperature scale factor TSF1 according to the temperature PT of the display panel 100 in the first operation mode M1, and determine the first scale factor SF1 based on the first load scale factor LSF1, the first grayscale scale factor NSF1, and the first temperature scale factor TSF1.

In an embodiment, the first load scale factor LSF1 may be determined in the same manner as in FIG. 4, the first temperature scale factor TSF1 may be determined in the same manner as in FIG. 13, and the first grayscale scale factor NSF1 may be determined in the same manner as in FIG. 6, for example. In an embodiment, the display panel driver 10 may determine an average value of the first load scale factor LSF1, the first temperature scale factor TSF1 and the first grayscale scale factor NSF1 as the first scale factor SF1. In an embodiment, the display panel driver 10 may determine a minimum value of the first load scale factor LSF1, the first temperature scale factor TSF1, and the first grayscale scale factor NSF1 as the first scale factor SF1.

The display panel driver 10 may determine the second load scale factor LSF2 according to the average image load APL in the second operation mode M2, determine the second grayscale scale factor NSF2 according to the grayscale value of the input image data IMG in the second operation mode M2, determine the second temperature scale factor TSF2 according to the temperature PT of the display panel 100 in the second operation mode M2, and determine the second scale factor SF2 based on the second load scale factor LSF2, the second grayscale scale factor NSF2, and the second temperature scale factor TSF2.

In an embodiment, the second load scale factor LSF2 may be determined in the same manner as in FIG. 5, the second temperature scale factor TSF2 may be determined in the same manner as in FIG. 14, and the second grayscale scale factor NSF2 may be determined in the same manner as in FIG. 7, for example. In an embodiment, the display panel driver 10 may determine an average value of the second load scale factor LSF2, the second temperature scale factor TSF2 and the second grayscale scale factor NSF2 as the second scale factor SF2. In an embodiment, the display panel driver 10 may determine a minimum value of the second load scale factor LSF2, the second temperature scale factor TSF2, and the second grayscale scale factor NSF2 as the second scale factor SF2.

Figure 21:
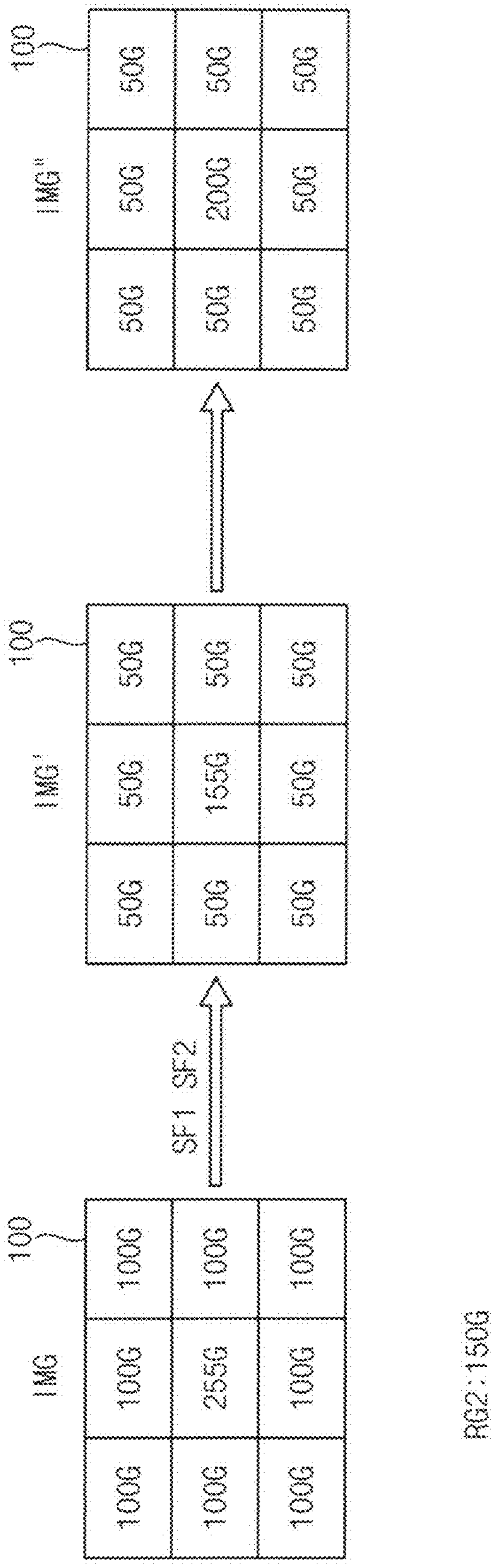
FIG. 21 is a diagram illustrating an embodiment in which a display device adjusts a grayscale value according to the invention.

FIG. 21 is a diagram illustrating an embodiment in which a display device adjusts a grayscale value according to the invention.

The display apparatus according to the illustrated embodiment is substantially the same as the display apparatus 1000 of FIG. 1 except for adjusting the grayscale value of input image data IMG' to which the first scale factor SF1 or the second scale factor SF2 is applied. Thus, the same reference numerals are used to refer to the same or similar element, and any repetitive explanation will be omitted.

Referring to FIGS. 1 and 21, the display panel driver 10 may increase the grayscale value of the input image data IMG' to which the first scale factor SF1 or the second scale factor SF2 is applied when the grayscale value of the input image data IMG' to which the first scale factor SF1 or the second scale factor SF2 is applied is greater than a second reference grayscale value RG2.

In an embodiment, as shown in FIG. 21, it is assumed that a 255 grayscale value 255G is displayed in a center area of the display panel 100 and a 100 grayscale value 100G is displayed in the remaining area when an image is displayed on the display panel 100 based on the input image data IMG to which the first scale factor SF1 or the second scale factor SF2 is not applied, and the second reference grayscale value RG2 is a 150 grayscale value 50G, for example. A 155 grayscale value 155G lower than the 255 grayscale value 255G may be displayed in the center area of the display panel 100 and a 50 grayscale value 50G lower than the 100 grayscale value 100G may be displayed in the remaining area. The display panel driver 10 may increase the 155 grayscale value 155G greater than the second reference grayscale value RG2 among the grayscale values of the input image data IMG' to which the first scale factor SF1 or the second scale factor SF2 is applied. As a result, when an image is displayed based on input image data IMG" having an increased grayscale value, a 200 grayscale value 200G greater than the 155 grayscale value 155G may be displayed in the center area of the display panel 100, and a 50 grayscale value 50G may be displayed in the remaining area as it is.

Accordingly, the display panel driver 10 may adjust the overall luminance of the displayed image to be low through the first and second scale factors SF1 and SF2 and then increase the luminance of a portion displaying a high grayscale value to enhance a visibility.

Figure 22:
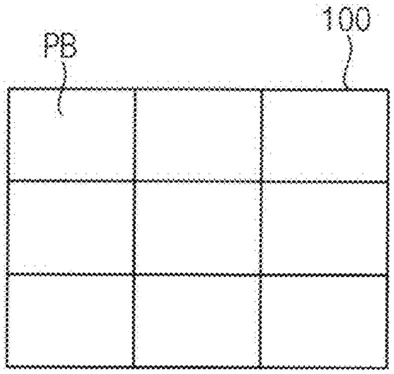
FIG. 22 is a diagram illustrating an embodiment of a display panel of a display device according to the invention.
Figure 23:
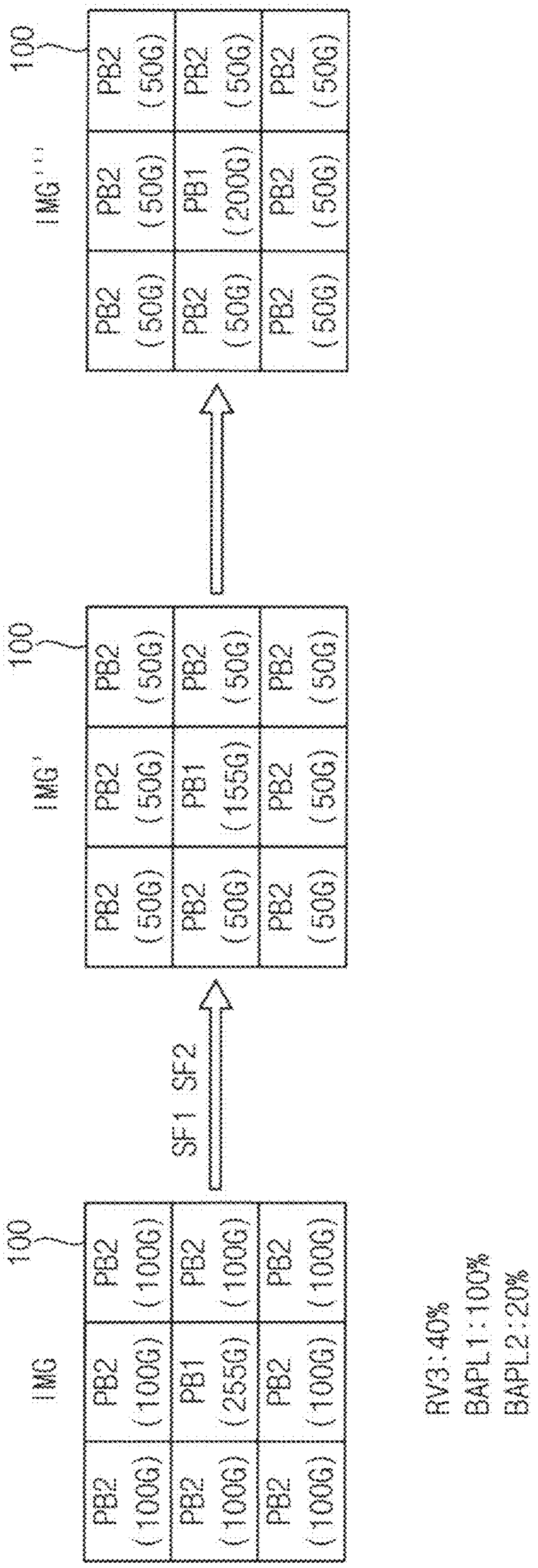
FIG. 23 is a diagram illustrating an embodiment in which the display device of FIG. 22 adjusts a grayscale value.

FIG. 22 is a diagram illustrating an embodiment of the display panel 100 of a display device according to the invention, and FIG. 23 is a diagram illustrating an embodiment in which the display device of FIG. 22 adjusts a grayscale value.

The display apparatus according to the illustrated embodiment is substantially the same as the display apparatus 1000 of FIG. 1 except for adjusting the grayscale value of input image data IMG' to which the scale factor SF1 or the second scale factor SF2 is applied. Thus, the same reference numerals are used to refer to the same or similar element, and any repetitive explanation will be omitted.

Referring to FIGS. 22 and 23, the display panel 100 may be divided into panel blocks PB. The panel blocks PB may include a first panel block PB1 and a second panel block PB2 adjacent to the first panel block PB1. The panel blocks PB may include the pixels P.

The display panel driver 10 may receive the input image data IMG and determine an average image load of each of the panel blocks PB based on the input image data IMG. In an embodiment, the display panel driver 10 may convert the input image data IMG of the RGB domain into the input image data of the luminance domain, and determine the average image load of each of the panel blocks PB by dividing a sum of luminance for each of the panel blocks PB of the input image data IMG of the luminance domain (i.e., the sum of luminance to be displayed in each of the panel blocks PB) by the number of the pixels P included in each of the panel blocks PB, for example. The average image load of each of the panel blocks PB may be normalized to have a value ranging from 0% to 100%. In an embodiment, when the input image data IMG corresponding to a predetermined panel block is a full white image, the average image load of the predetermined panel block may be 100%, for example. In an embodiment, when the input image data IMG corresponding to a predetermined panel block is a full black image, the average image load of the predetermined panel block may be 0%, for example.

The display panel driver 10 may increase the grayscale value of the input image data IMG' corresponding to the first panel block PB1 to which the first scale factor SF1 or the second scale factor SF2 is applied when an average image load BAPL1 of the first panel block PB1 is greater than a sum of an average image load BAPL2 of the second panel block PB2 and a third reference value RV3.

In an embodiment, as shown in FIG. 23, it is assumed that the 255 grayscale value 255G is displayed in a first panel block PB1 of the display panel 100 (i.e., an average of grayscale values of the pixels P included in the first panel block PB1 is the 255 grayscale 255G), and the 100 grayscale value 100G is displayed in the second panel block PB2 (i.e., an average of grayscale values of the pixels P included in the second panel block PB2 adjacent to the first panel block PB1 is the 100 grayscale 100G) when an image is displayed on the display panel 100 based on the input image data IMG to which the first scale factor SF1 or the second scale factor SF2 is not applied, the third reference value RV3 is 40%, the average image load BAPL1 of the first panel block PB1 is 100%, and the average image load BAPL2 of the second panel block PB2 is 20%, for example. The 155 grayscale value 155G lower than the 255 grayscale value 255G may be displayed in the first panel block PB1 (i.e., an average of grayscale values of the pixels P included in the first panel block PB1 is the 155 grayscale 155G) and the 50 grayscale value 50G lower than the 100 grayscale value 100G may be displayed in the second panel block PB2 (i.e., an average of grayscale values of the pixels P included in the second panel block PB2 adjacent to the first panel block PB1 is the 50 grayscale 50G).

Since the average image load BAPL1 of the first panel block PB1 of the input image data IMG' to which the first scale factor SF1 or the second scale factor SF2 is applied is greater than the sum of the average image load BAPL2 of the second panel block PB2 and the third reference value RV3, the display panel driver 10 may increase the grayscale value of a portion corresponding to the first panel block PB1. As a result, when an image is displayed based on input image data IMG" having an increased grayscale value, the 200 grayscale value 200G greater than the 155 grayscale value 155G may be displayed in the first panel block PB1 (i.e., an average of grayscale values of the pixels P included in the first panel block PB1 is the 200 grayscale 200G), and a 50 grayscale value 50G may be displayed in the second panel block PB2 as it is.

Accordingly, the display panel driver 10 may adjust the overall luminance of the displayed image to be low through the first and second scale factors SF1 and SF2 and then increase the luminance of a portion displaying a high grayscale value to enhance the visibility.

The embodiments of the invention may be applied to any electronic device including the display device. The embodiments of the invention may be applied to a television ("TV"), a digital TV, a three dimensional ("3D") TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the illustrative embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display device comprising:

a display panel including a plurality of pixels; and a display panel driver which determines an average image load of input image data, determines an operation mode based on a grayscale value of the input image data and the average image load as a first operation mode or a second operation mode, applies a first scale factor to the input image data in the first operation mode, applies a second scale factor different from the first scale factor to the input image data in the second operation mode, and drives the display panel, wherein the display panel driver operates as the first operation mode when a number of pixels which display the grayscale value less than or equal to a first reference grayscale value, among the plurality of pixels, is greater than a first reference number and the average image load is less than or equal to a first reference load.

2. The display device of claim 1, wherein the display panel driver generates a histogram for the grayscale value of the input image data, and calculates the number of the pixels which display the grayscale value less than or equal to the first reference grayscale value based on the histogram.

3. The display device of claim 1, wherein the display panel driver determines a first load scale factor according to the average image load in the first operation mode, determines a first grayscale scale factor according to the grayscale value of the input image data in the first operation mode, determines the first scale factor based on the first load scale factor and the first grayscale scale factor, determines a second load scale factor according to the average image load in the second operation mode, determines a second grayscale scale factor according to the grayscale value of the input image data in the second operation mode, and determines the second scale factor based on the second load scale factor and the second grayscale scale factor.

4. The display device of claim 1, wherein the first scale factor decreases as the average image load increases in a period in which the average image load is greater than or equal to a second reference load, and has a first reference value in a period in which the average image load is less than the second reference load.

5. The display device of claim 4, wherein the second scale factor decreases as the average image load increases in a period in which the average image load is greater than or equal to a first reference load greater than the second reference load, and has a second reference value less than the first reference value in a period in which the average image load is less than the first reference load.

6. The display device of claim 1, wherein the first scale factor decreases as a number of pixels which display the grayscale value less than or equal to a first reference grayscale value, among the plurality of pixels, decreases in a period in which the number of the pixels which display the grayscale value less than or equal to the first reference grayscale value is less than or equal to a second reference number, and has a first reference value in a period in which the number of the pixels which display the grayscale value less than or equal to the first reference grayscale value is greater than the second reference number, and wherein the second scale factor decreases as the number of the pixels which display the grayscale value less than or equal to the first reference grayscale value decreases in a period in which the number of the pixels which display the grayscale value less than or equal to the first reference grayscale value is less than or equal to a first reference number less than the second reference number, and has a second reference value less than the first reference value in a period in which the number of the pixels which display the grayscale value less than or equal to the first reference grayscale value is greater than the first reference number.

7. The display device of claim 1, wherein the display device operates as the first operation mode when a number of pixels which display the grayscale value less than or equal to a first reference grayscale value, among the plurality of pixels, is greater than a first reference number and a temperature of the display panel is lower than or equal to a first reference temperature.

8. The display device of claim 7, the display panel driver determines a first load scale factor according to the average image load in the first operation mode, determines a first grayscale scale factor according to the grayscale value of the input image data in the first operation mode, determines a first temperature scale factor according to the temperature of the display panel in the first operation mode, determines the first scale factor based on the first load scale factor, the first grayscale scale factor, and the first temperature scale factor, determines a second load scale factor according to the average image load in the second operation mode, determines a second grayscale scale factor according to the grayscale value of the input image data in the second operation mode, determines a second temperature scale factor according to the temperature of the display panel in the second operation mode, and determines the second scale factor based on the second load scale factor, the second grayscale scale factor, and the second temperature scale factor.

9. The display device of claim 1, wherein the display panel driver applies the second scale factor to pixels in which a deterioration degree of the pixels is greater than a reference deterioration degree among the plurality of pixels.

10. The display device of claim 1, wherein the display panel driver increases the grayscale value of the input image data to which the first scale factor or the second scale factor is applied when the grayscale value of the input image data to which the first scale factor or the second scale factor is applied is greater than a second reference grayscale value.

11. The display device of claim 1, wherein the display panel is divided into panel blocks, wherein the panel blocks include a first panel block and a second panel block adjacent to the first panel block, and wherein the display panel driver increases the grayscale value of the input image data corresponding to the first panel block to which the first scale factor or the second scale factor is applied when an average image load of the first panel block is greater than a sum of an average image load of the second panel block and a third reference value.

12. A display device comprising:

a display panel including a plurality of pixels; and a display panel driver which determines an average image load of input image data, determines an operation mode based on a temperature of the display panel and the average image load as a first operation mode or a second operation mode, applies a first scale factor to the input image data in the first operation mode, applies a second scale factor different from the first scale factor to the input image data in the second operation mode, and drives the display panel, wherein the display panel driver operates as the first operation mode when the temperature of the display panel is lower than or equal to a first reference temperature and the average image load is less than or equal to a first reference load, and wherein the display panel driver determines a first load scale factor according to the average image load in the first operation mode, determines a first temperature scale factor according to the temperature of the display panel in the first operation mode, determines the first scale factor based on the first load scale factor and the first temperature scale factor, determines a second load scale factor according to the average image load in the second operation mode, determines a second temperature scale factor according to the temperature of the display panel in the second operation mode, and determines the second scale factor based on the second load scale factor and the second temperature scale factor.

13. The display device of claim 12, wherein the first scale factor decreases as the average image load increases in a period in which the average image load is greater than or equal to a second reference load, and has a first reference value in a period in which the average image load is less than the second reference load, and wherein the second scale factor decreases as the average image load increases in a period in which the average image load is greater than or equal to a first reference load greater than the second reference load, and has a second reference value less than the first reference value in a period in which the average image load is less than the first reference load.

14. The display device of claim 12, wherein the first scale factor decreases as the temperature of the display panel increases in a period in which the temperature of the display panel is higher than or equal to a second reference temperature, and has a first reference value in a period in which the temperature of the display panel is lower than the second reference temperature, and wherein the second scale factor decreases as the temperature of the display panel increases in a period in which the temperature of the display panel is higher than a first reference temperature higher than the second reference temperature, and has a second reference value less than the first reference value in a period in which the temperature of the display panel is lower than the first reference temperature.

15. The display device of claim 12, wherein the display panel driver determines the temperature of the display panel by accumulating the input image data.

16. The display device of claim 12, wherein the display panel driver determines the temperature of the display panel by sensing driving currents of the pixels.

17. A display device comprising:

a display panel including a plurality of pixels; and a display panel driver which determines an operation mode based on a temperature of the display panel and a grayscale value of input image data as a first operation mode or a second operation mode, applies a first scale factor to the input image data in the first operation mode, applies a second scale factor different from the first scale factor to the input image data in the second operation mode, and drives the display panel, wherein the first scale factor is determined based on a first grayscale scale factor and a first temperature scale factor, and the second scale factor is determined based on a second grayscale scale factor and a second temperature scale factor, and wherein the display panel driver operates as the first operation mode when a number of pixels which display the grayscale value less than or equal to a first reference grayscale value, among the plurality of pixels, is greater than a first reference number.

* * * * *